United States Patent
Liu

(10) Patent No.: US 10,411,994 B2
(45) Date of Patent: Sep. 10, 2019

(54) MULTI-LINK CONVERGENCE METHOD, SERVER, CLIENT, AND SYSTEM

(71) Applicant: Huawei Technologies Co., Ltd., Shenzhen (CN)

(72) Inventor: De Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 334 days.

(21) Appl. No.: 15/505,869

(22) PCT Filed: Aug. 22, 2014

(86) PCT No.: PCT/CN2014/085054
§ 371 (c)(1),
(2) Date: Feb. 22, 2017

(87) PCT Pub. No.: WO2016/026154
PCT Pub. Date: Feb. 25, 2016

(65) Prior Publication Data
US 2017/0279708 A1 Sep. 28, 2017

(51) Int. Cl.
| | |
|---|---|
| G06F 15/16 | (2006.01) |
| H04L 12/709 | (2013.01) |
| H04L 29/04 | (2006.01) |
| H04L 29/06 | (2006.01) |
| H04L 12/751 | (2013.01) |
| H04W 12/06 | (2009.01) |

(Continued)

(52) U.S. Cl.
CPC ........... *H04L 45/245* (2013.01); *H04L 29/04* (2013.01); *H04L 45/02* (2013.01); *H04L 63/08* (2013.01); *H04L 63/18* (2013.01); *H04W 12/06* (2013.01); *H04L 45/24* (2013.01); *H04L 2463/082* (2013.01); *H04W 28/10* (2013.01); *H04W 88/06* (2013.01)

(58) Field of Classification Search
CPC ....................................................... H04L 63/18
USPC ........................................................ 709/235
See application file for complete search history.

(56) References Cited

U.S. PATENT DOCUMENTS

| | | | |
|---|---|---|---|
| 7,388,829 B2 | 6/2008 | Sivakumar et al. | |
| 2003/0223450 A1 | 12/2003 | Bender et al. | |

FOREIGN PATENT DOCUMENTS

| | | |
|---|---|---|
| CN | 1523790 A | 8/2004 |
| CN | 101056257 A | 10/2007 |

(Continued)

*Primary Examiner* — Hamza N Algibhah
(74) *Attorney, Agent, or Firm* — Leydig, Voit & Mayer, Ltd.

(57) ABSTRACT

A multi-link convergence method include: receiving a first binding request sent by a client using a first link; sending a first LSID to the client using the first link; receiving a first authentication request sent by the client using the first link; performing authentication on the first link according to the first authentication request; if the first link is authenticated successfully, sending a BID to the client using the first link; receiving a second binding request sent by the client using a second link, where the second binding request carries the BID; sending a second LSID to the client using the second link; receiving a second authentication request sent the client by using the second link; performing authentication on the second link according to the second authentication request; and if the second link is authenticated successfully, sending a binding acknowledgement message to the client using the second link.

19 Claims, 17 Drawing Sheets

(51) Int. Cl.
*H04L 12/707* (2013.01)
*H04W 28/10* (2009.01)
*H04W 88/06* (2009.01)

(56) References Cited

FOREIGN PATENT DOCUMENTS

| | | |
|---|---|---|
| CN | 101784090 A | 7/2010 |
| CN | 102299852 A | 12/2011 |
| WO | 2013162807 A1 | 10/2013 |

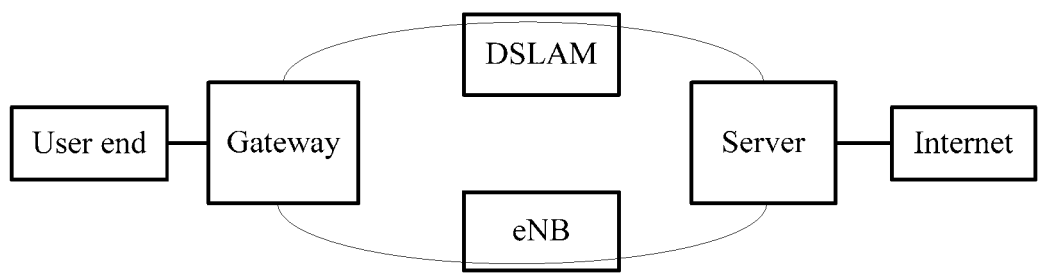
FIG. 5-a
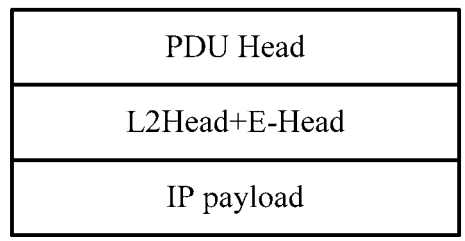
FIG. 5-b

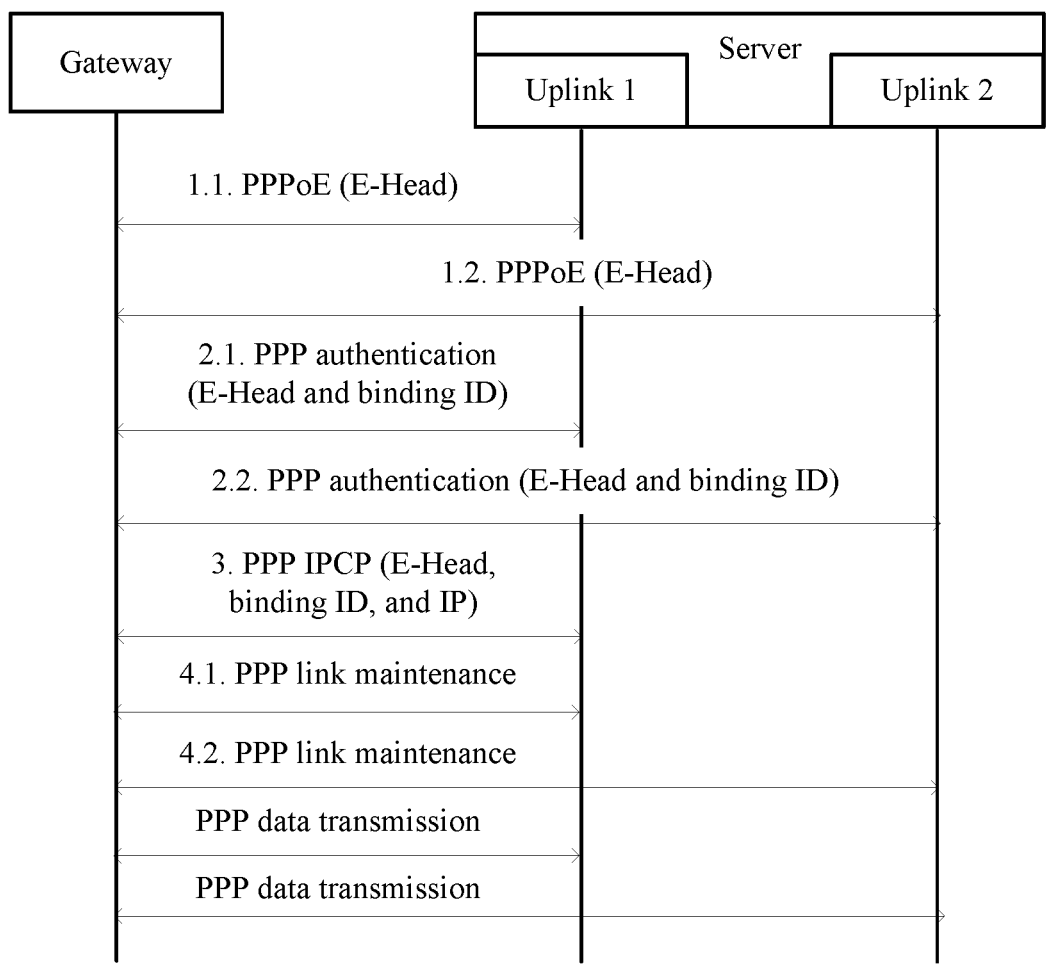
FIG. 5-c

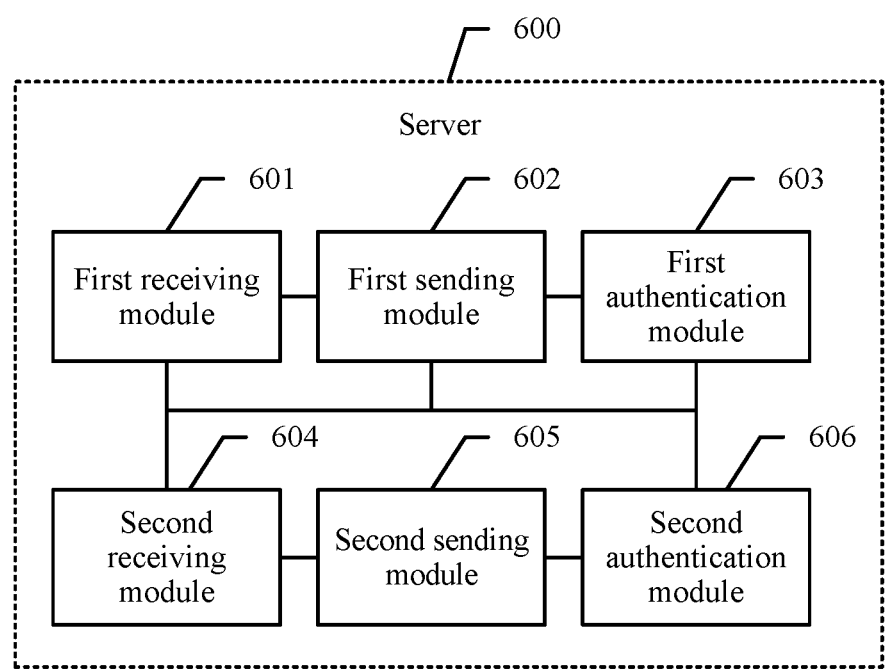
FIG. 6-a

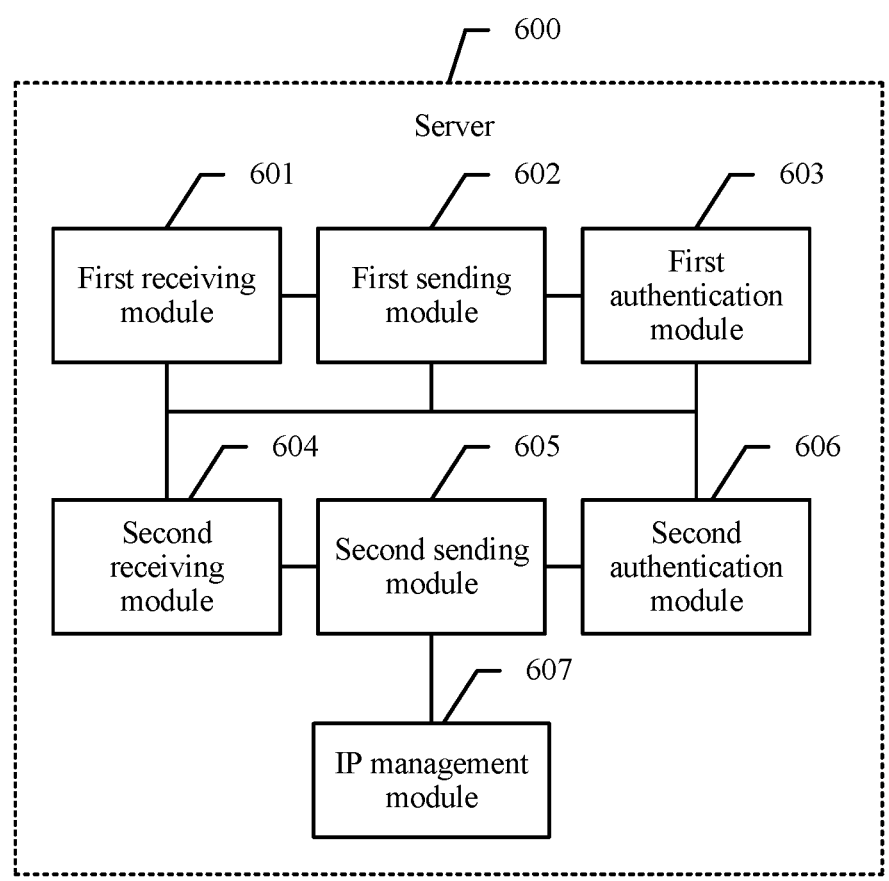
FIG. 6-b

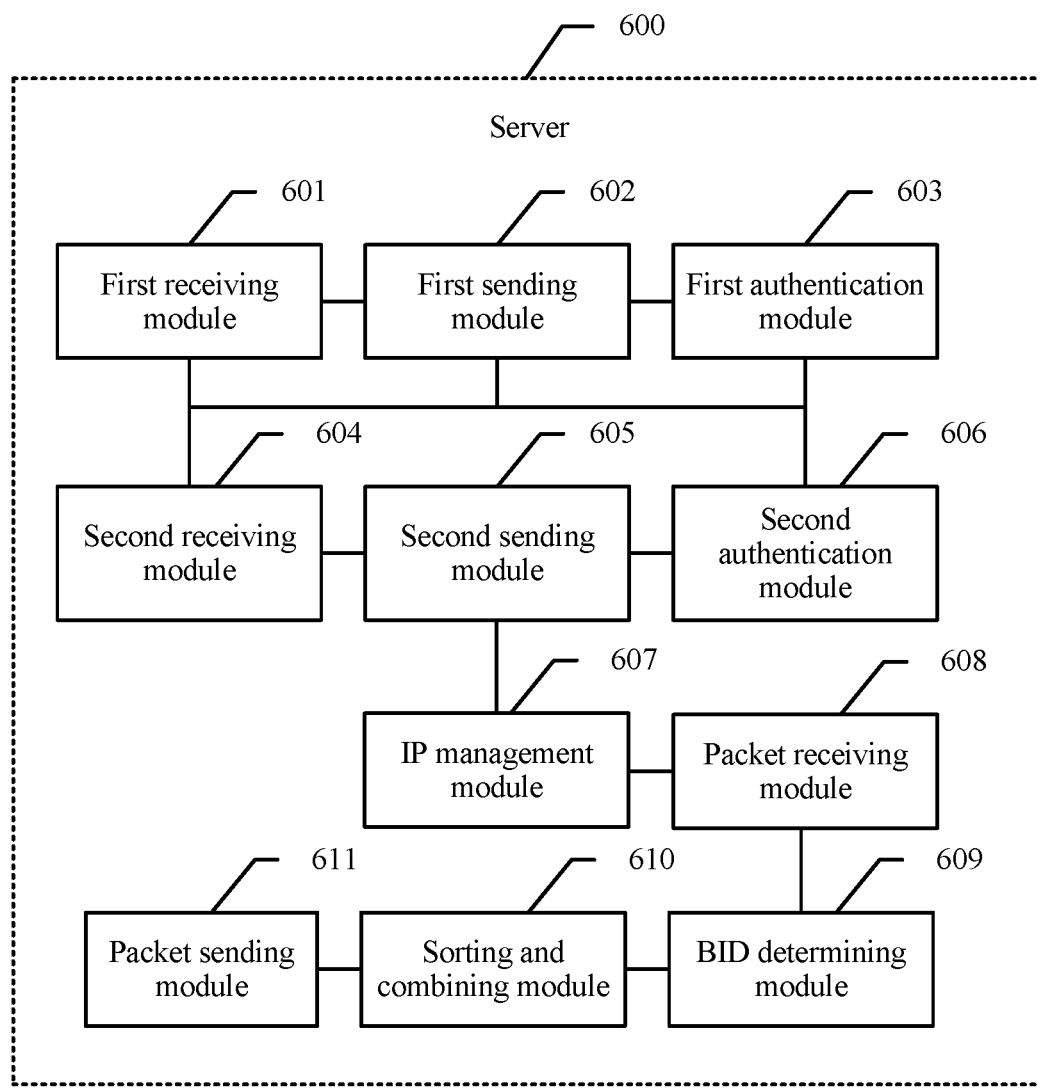
FIG. 6-c

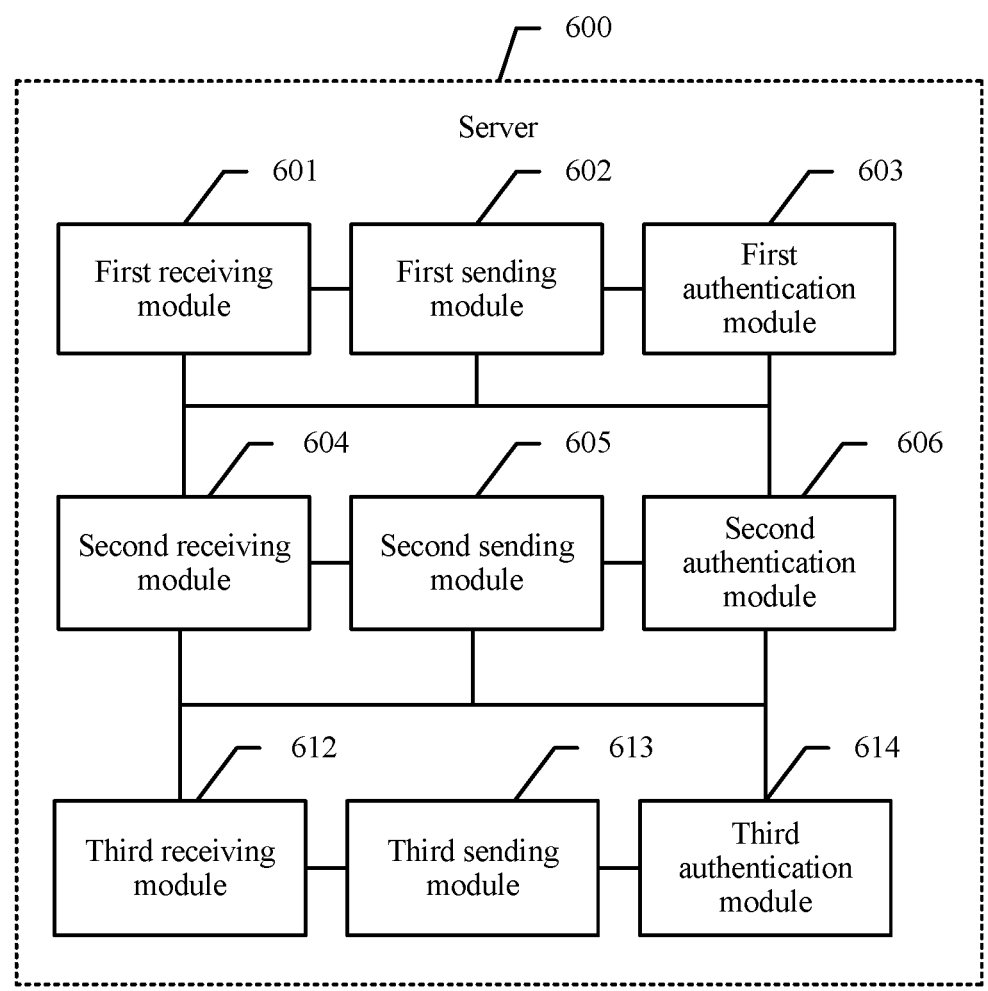
FIG. 6-d

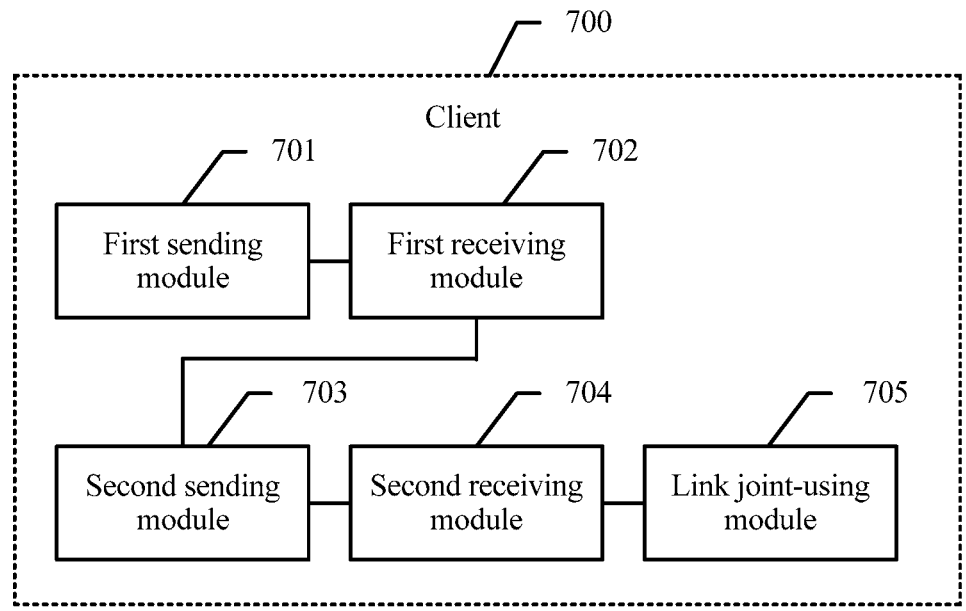
FIG. 7-a
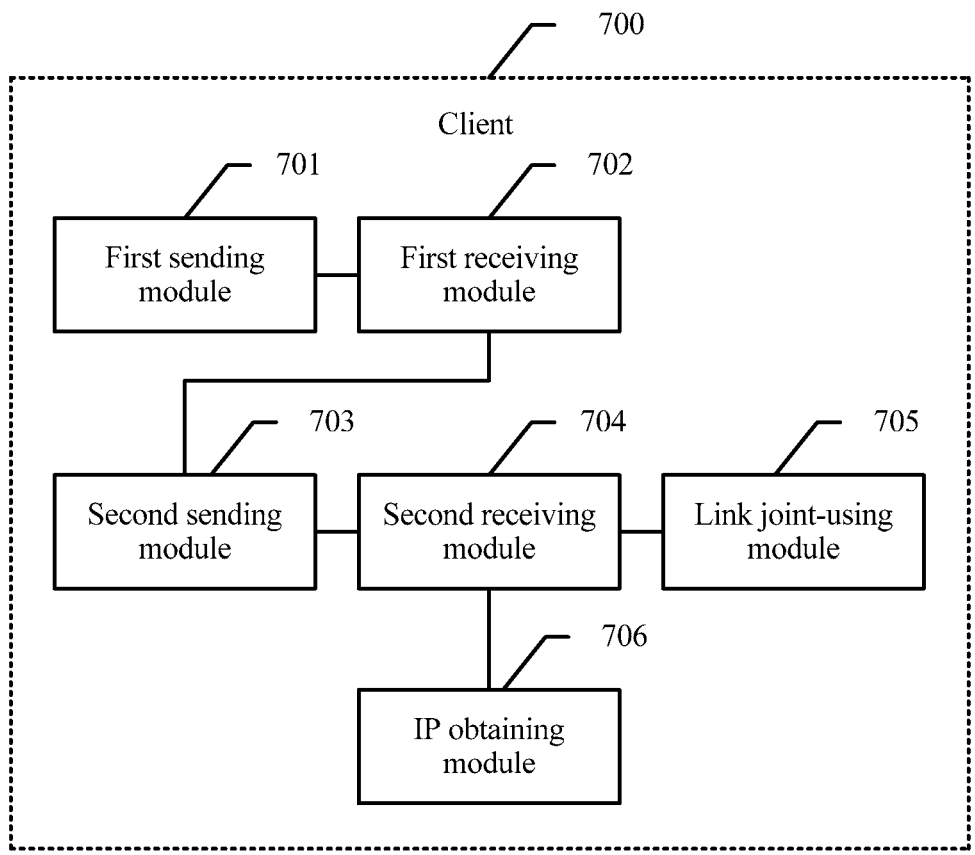
FIG. 7-b

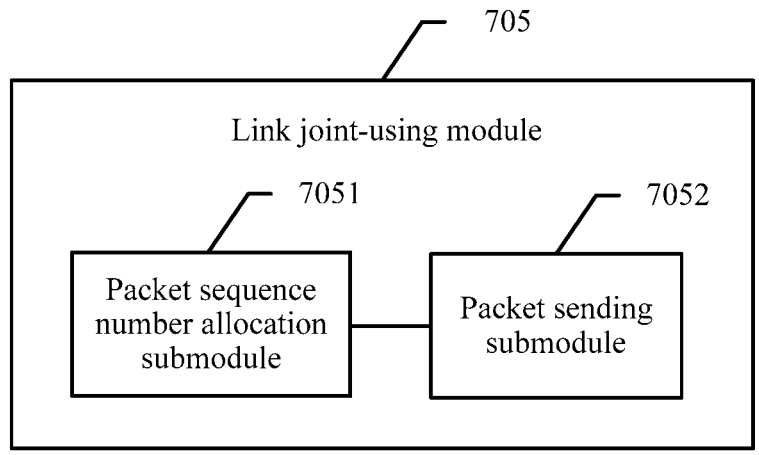
FIG. 7-c
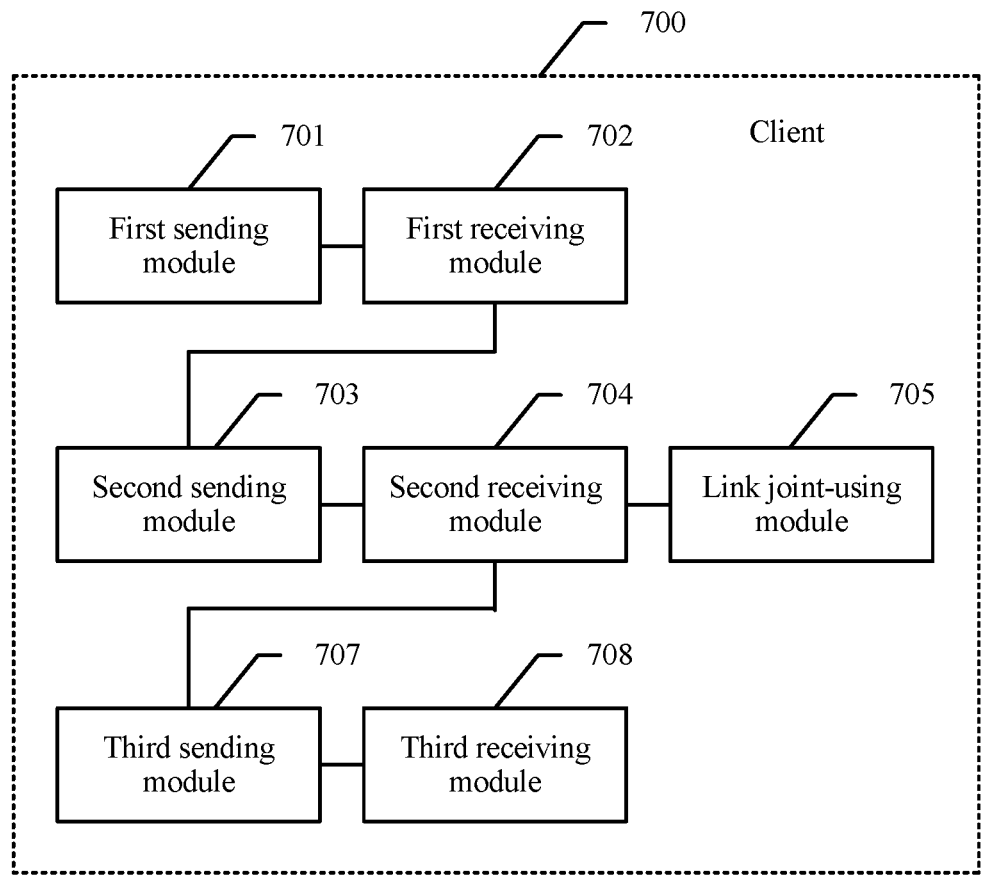
FIG. 7-d

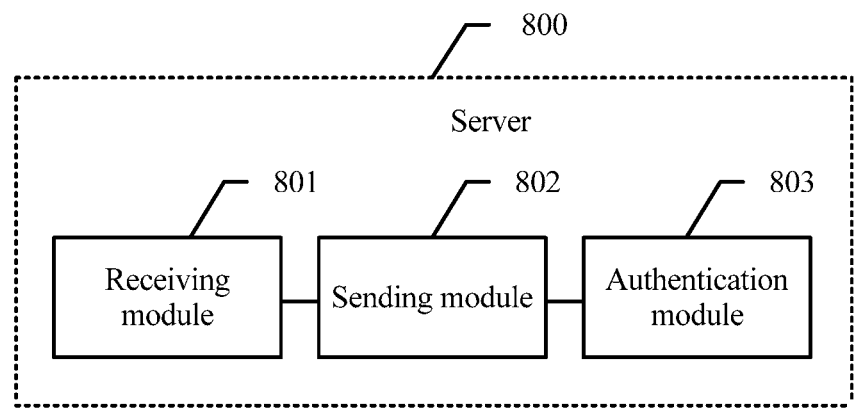
FIG. 8-a
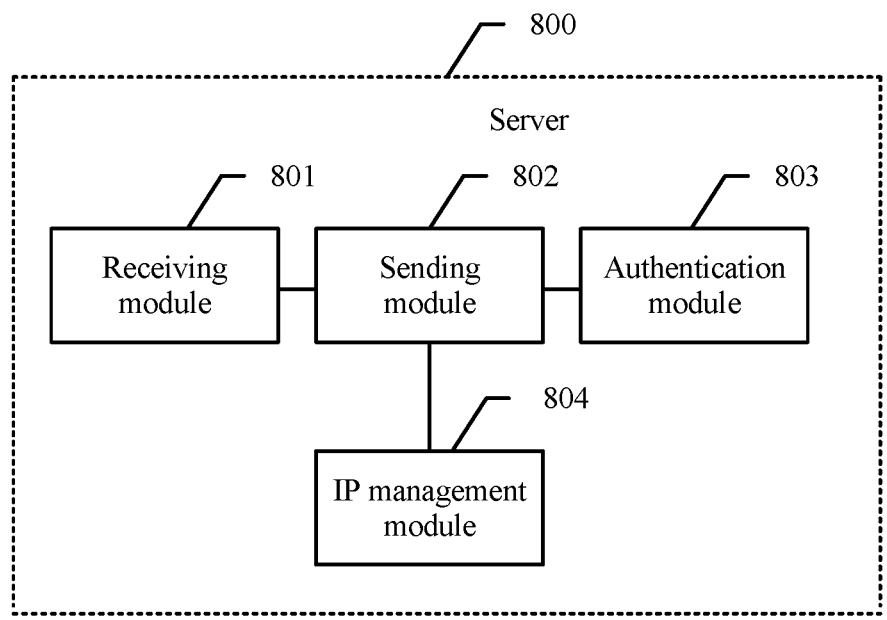
FIG. 8-b

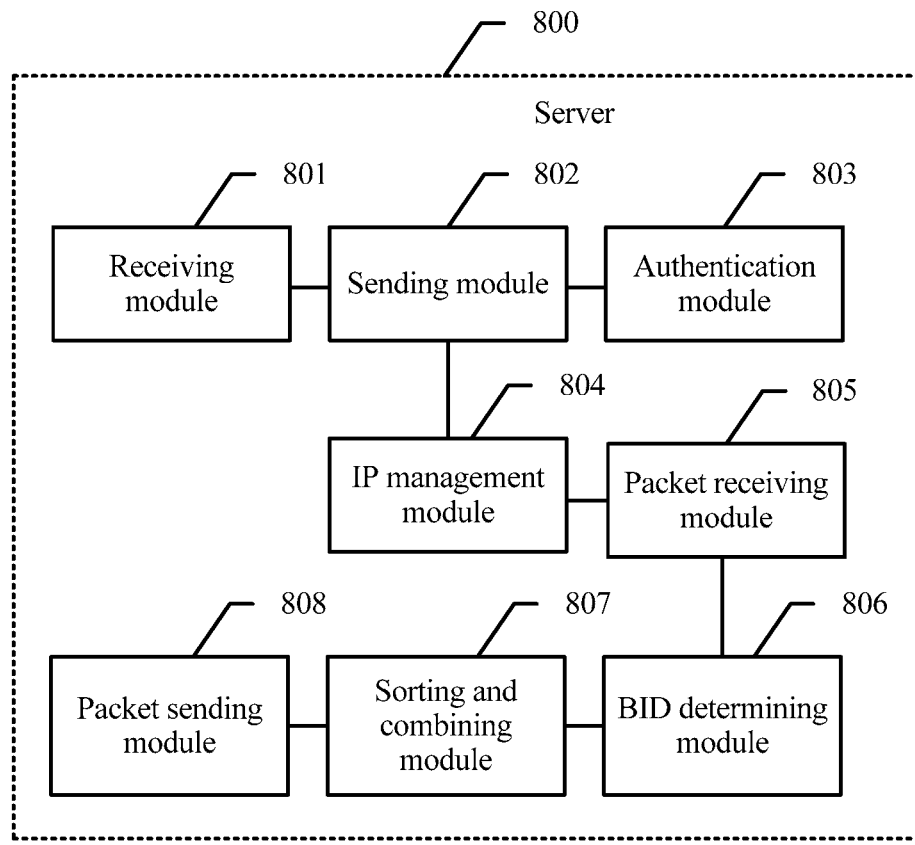
FIG. 8-c
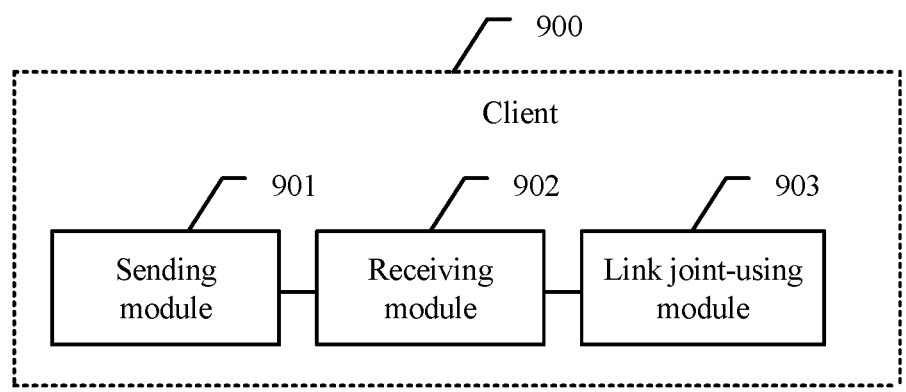
FIG. 9-a

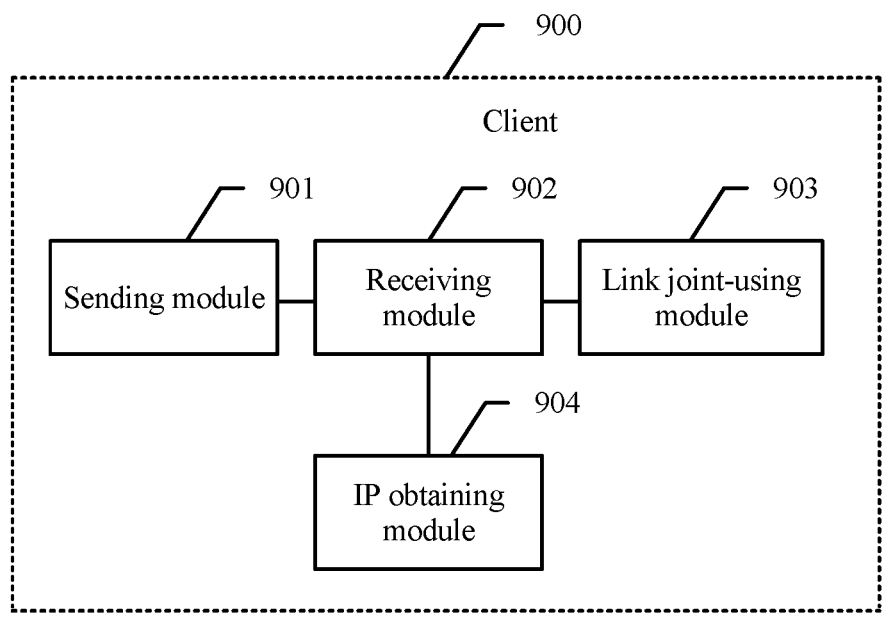
FIG. 9-b
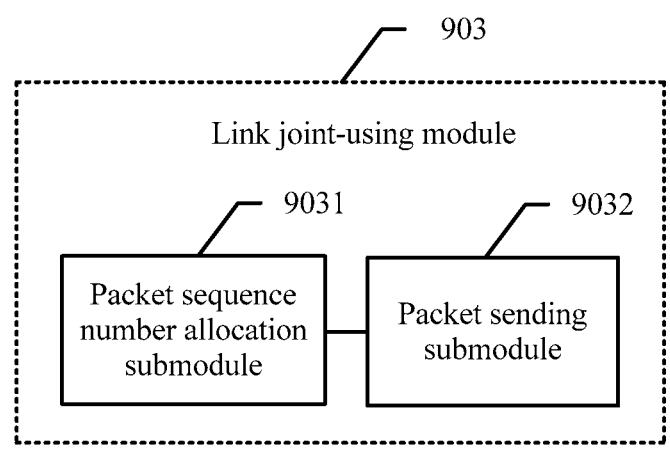
FIG. 9-c

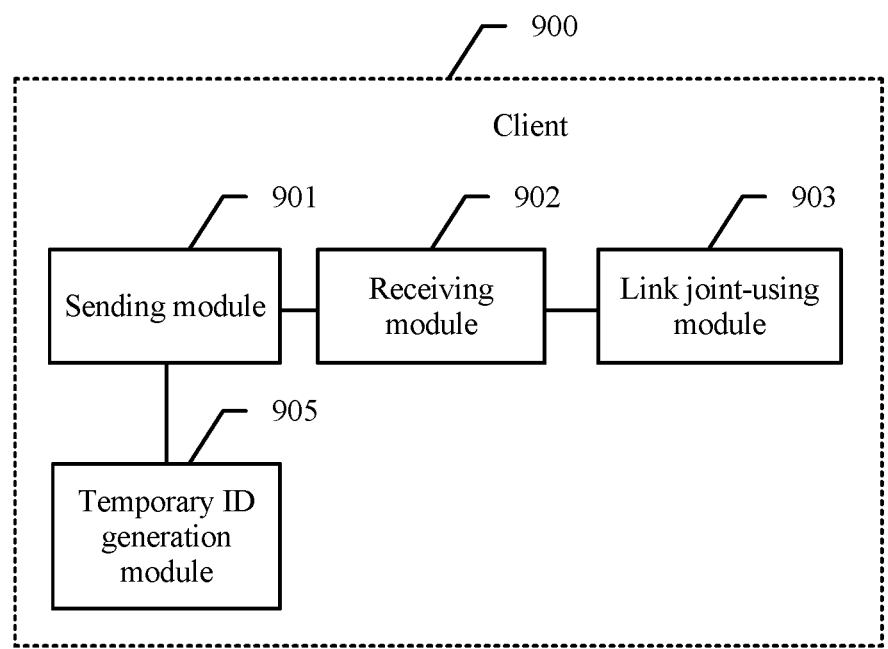
FIG. 9-d
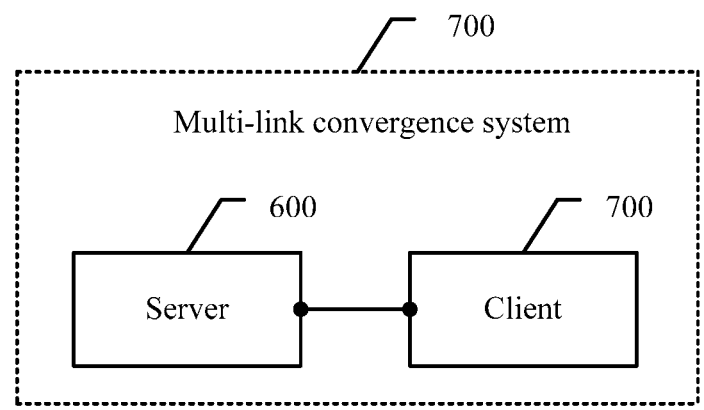
FIG. 10

MULTI-LINK CONVERGENCE METHOD, SERVER, CLIENT, AND SYSTEM

TECHNICAL FIELD

Embodiments of the present invention relate to the communications field, and in particular, to a multi-link convergence method, a server, a client, and a system.

BACKGROUND

With development of Internet Protocol (Internet Protocol, IP) technologies, convergence of multiple networks based on the IP technologies becomes an inevitable trend in future network development. Featuring wide coverage, the convergence relates to various aspects, such as users, operators, network technologies, devices, and solutions. From a perspective of a user, the user expects that the user can enjoy ubiquitous personalized services by using various wired and wireless converged access modes and easy and feasible communication modes. An operator expects to provide quadruple-play service operation for users in a unified manner, and increase market share and profit.

In construction of a public bearer platform based on the IP technologies, a critical point for access network convergence is to implement convergence of various broadband access modes and seamless handover of services between various access networks. In the prior art, a method for converged access in different networks uses a link backup mode to implement bandwidth binding in multiple networks. The link backup mode is merely to use multiple links in a time-sharing manner. However, when specifically viewed from a certain period of time, it is still single-link access, and in essence, real bandwidth convergence is not implemented.

SUMMARY

Embodiments of the present invention provide a multi-link convergence method, a server, a client, and a system, so as to implement multi-link convergence and increase available bandwidth.

According to a first aspect, an embodiment of the present invention provides a multi-link convergence method, including:

receiving, by a server, a first binding request sent by a client by using a first link, where at least two links are established between the client and the server, and the first link is one link in the at least two links;

sending, by the server, a first link session identity LSID to the client by using the first link;

receiving, by the server, a first authentication request sent by the client by using the first link, where the first authentication request includes the first LSID and first authentication information;

performing, by the server, authentication on the first link according to the first authentication request;

if the first link is authenticated successfully, sending, by the server, a binding identity BID to the client by using the first link;

receiving, by the server, a second binding request sent by the client by using a second link, where the second binding request carries the BID, and the second link is a link other than the first link in the at least two links;

sending, by the server, a second LSID to the client by using the second link;

receiving, by the server, a second authentication request sent by the client by using the second link, where the second authentication request includes the second LSID and second authentication information;

performing, by the server, authentication on the second link according to the second authentication request; and if the second link is authenticated successfully, sending, by the server, a binding acknowledgement message to the client by using the second link, so that the client can use both the first link and the second link to send to-be-sent data packets, where extension headers of the to-be-sent data packets carry the BID.

With reference to the first aspect, in a first possible implementation manner of the first aspect, after the sending, by the server, a binding acknowledgement message to the client by using the second link, the method further includes:

receiving, by the server, an IP address request sent by the client by using the first link or the second link; and allocating, by the server, an IP address to the client, and sending the IP address to the client.

According to a second aspect, an embodiment of the present invention provides a multi-link convergence method, including:

sending, by a client, a first binding request to a server by using a first link, where at least two links are established between the client and the server, and the first link is one link in the at least two links;

receiving, by the client, a first link session identity LSID sent by the server by using the first link;

sending, by the client, a first authentication request to the server by using the first link, where the first authentication request includes the first LSID and first authentication information;

receiving, by the client, a binding identity BID sent by the server by using the first link;

sending, by the client, a second binding request to the server by using a second link, where the second binding request carries the BID, and the second link is a link other than the first link in the at least two links;

receiving, by the client, a second LSID sent by the server by using the second link;

sending, by the client, a second authentication request to the server by using the second link, where the second authentication request includes the second LSID and second authentication information;

receiving, by the client, a binding acknowledgement message sent by the server by using the second link; and when the client needs to send data packets, using, by the client, both the first link and the second link to send the to-be-sent data packets, where extension headers of the to-be-sent data packets carry the BID.

With reference to the second aspect, in a first possible implementation manner of the second aspect, after the receiving, by the client, a binding acknowledgement message sent by the server by using the second link, the method further includes:

sending, by the client, an IP address request to the server by using the first link or the second link; and receiving, by the client, an IP address allocated by the server to the client.

According to a third aspect, an embodiment of the present invention provides a multi-link convergence method, including:

receiving, by a server, a first binding request sent by a client by using a first link, and receiving a second binding request sent by the client by using a second link, where at least two links are established between the client and the server, the first link is one link in the at least two links, the second link is a link other than the first link in the at least two links, the first binding request carries a first temporary identity ID, and the second binding request carries a second temporary ID;

sending, by the server, a first link session identity LSID to the client by using the first link, and sending a second LSID to the client by using the second link;

receiving, by the server, a first authentication request sent by the client by using the first link, and receiving a second authentication request sent by the client by using the second link, where the first authentication request includes the first LSID and first authentication information, and the second authentication request includes the second LSID and second authentication information;

performing, by the server, authentication on the first link according to the first authentication request, and performing authentication on the second link according to the second authentication request; and if both the first link and the second link are authenticated successfully, and the server determines that the first temporary ID and the second temporary ID are the same temporary ID, sending, by the server, a binding identity BID to the client by using the first link, and sending the BID to the client by using the second link, so that the client can use both the first link and the second link to send to-be-sent data packets, where extension headers of the to-be-sent data packets carry the BID.

With reference to the third aspect, in a first possible implementation manner of the third aspect, after the sending, by the server, a binding identity BID to the client by using the first link, and sending the BID to the client by using the second link, the method further includes:

receiving, by the server, an IP address request sent by the client by using the first link or the second link; and allocating, by the server, an IP address to the client, and sending the IP address to the client.

According to a fourth aspect, an embodiment of the present invention provides a multi-link convergence method, including:

sending, by a client, a first binding request to a server by using a first link, and sending a second binding request to the server by using a second link, where at least two links are established between the client and the server, the first link is one link in the at least two links, the second link is a link other than the first link in the at least two links, the first binding request carries a first temporary identity ID, and the second binding request carries a second temporary ID;

receiving, by the client, a first link session identity LSID sent by the server by using the first link, and receiving a second LSID sent by the server by using the second link;

sending, by the client, a first authentication request to the server by using the first link, and sending a second authentication request to the server by using the second link, where the first authentication request includes the first LSID and first authentication information, and the second authentication request includes the second LSID and second authentication information;

receiving, by the client, a binding identity BID sent by the server by using the first link, and receiving the BID sent by the server by using the second link; and when the client needs to send data packets, using, by the client, both the first link and the second link to send the to-be-sent data packets, where extension headers of the to-be-sent data packets carry the BID.

With reference to the fourth aspect, in a first possible implementation manner of the fourth aspect, after the receiving, by the client, a binding identity BID sent by the server by using the first link, and receiving the BID sent by the server by using the second link, the method further includes:

sending, by the client, an IP address request to the server by using the first link or the second link; and receiving, by the client, an IP address allocated by the server to the client.

According to a fifth aspect, an embodiment of the present invention provides a server, including:

a first receiving module, a first sending module, a first authentication module, a second receiving module, a second sending module, and a second authentication module, where the first receiving module is configured to receive a first binding request sent by a client by using a first link, where at least two links are established between the client and the server, and the first link is one link in the at least two links;

the first sending module is configured to send a first link session identity LSID to the client by using the first link;

the first receiving module is further configured to receive a first authentication request sent by the client by using the first link, where the first authentication request includes the first LSID and first authentication information;

the first authentication module is configured to perform authentication on the first link according to the first authentication request;

the first sending module is further configured to send, when the first authentication module authenticates the first link successfully, a binding identity BID to the client by using the first link;

the second receiving module is configured to receive a second binding request sent by the client by using a second link, where the second binding request carries the BID, and the second link is a link other than the first link in the at least two links;

the second sending module is configured to send a second LSID to the client by using the second link;

the second receiving module is further configured to receive a second authentication request sent by the client by using the second link, where the second authentication request includes the second LSID and second authentication information;

the second authentication module is configured to perform authentication on the second link according to the second authentication request; and the second sending module is further configured for the server to send, when the second authentication module authenticates the second link successfully, a binding acknowledgement message to the client by using the second link, so that the client can use both the first link and the second link to send to-be-sent data packets, where extension headers of the to-be-sent data packets carry the BID.

With reference to the fifth aspect, in a first possible implementation manner of the fifth aspect, the server further includes:

an IP management module, configured to: after the second sending module sends the binding acknowledgement message to the client by using the second link, receive an IP address request sent by the client by using the first link or the second link; and allocate an IP address to the client, and send the IP address to the client.

According to a sixth aspect, an embodiment of the present invention provides a client, including:

a first sending module, a first receiving module, a second sending module, a second receiving module, and a link joint-using module, where the first sending module is configured to send a first binding request to a server by using a first link, where at least two links are established between the client and the server, and the first link is one link in the at least two links;

the first receiving module is configured to receive a first link session identity LSID sent by the server by using the first link;

the first sending module is configured to send a first authentication request to the server by using the first link, where the first authentication request includes the first LSID and first authentication information;

the first receiving module is configured to receive a binding identity BID sent by the server by using the first link;

the second sending module is configured to send a second binding request to the server by using a second link, where the second binding request carries the BID, and the second link is a link other than the first link in the at least two links;

the second receiving module is configured to receive a second LSID sent by the server by using the second link;

the second sending module is further configured to send a second authentication request to the server by using the second link, where the second authentication request includes the second LSID and second authentication information;

the second receiving module is further configured to receive a binding acknowledgement message sent by the server by using the second link; and the link joint-using module is configured to jointly use, when the client needs to send data packets, the first link and the second link to send the to-be-sent data packets, where extension headers of the to-be-sent data packets carry the BID.

With reference to the sixth aspect, in a first possible implementation manner of the sixth aspect, the client further includes:

an IP obtaining module, configured to: after the second receiving module receives the binding acknowledgement message sent by the server by using the second link, send an IP address request to the server by using the first link or the second link; and receive an IP address allocated by the server to the client.

According to a seventh aspect, an embodiment of the present invention provides a server, including a receiving module, a sending module, and an authentication module, where the receiving module is configured to receive a first binding request sent by a client by using a first link, and receive a second binding request sent by the client by using a second link, where at least two links are established between the client and the server, the first link is one link in the at least two links, the second link is a link other than the first link in the at least two links, the first binding request carries a first temporary identity ID, and the second binding request carries a second temporary ID;

the sending module is configured to send a first link session identity LSID to the client by using the first link, and send a second LSID to the client by using the second link;

the receiving module is further configured to receive a first authentication request sent by the client by using the first link, and receive a second authentication request sent by the client by using the second link, where the first authentication request includes the first LSID and first authentication information, and the second authentication request includes the second LSID and second authentication information;

the authentication module is configured to perform authentication on the first link according to the first authentication request, and perform authentication on the second link according to the second authentication request; and the sending module is further configured to: when the authentication module authenticates both the first link and the second link successfully, and the server determines that the first temporary ID and the second temporary ID are the same temporary ID, send a binding identity BID to the client by using the first link, and send the BID to the client by using the second link, so that the client can use both the first link and the second link to send to-be-sent data packets, where extension headers of the to-be-sent data packets carry the BID.

With reference to the seventh aspect, in a first possible implementation manner of the seventh aspect, the server further includes:

an IP management module, configured to: after the sending module sends the binding identity BID to the client by using the first link, and sends the BID to the client by using the second link, receive an IP address request sent by the client by using the first link or the second link; and allocate an IP address to the client, and send the IP address to the client.

According to an eighth aspect, an embodiment of the present invention provides a client, including a sending module, a receiving module, and a link joint-using module, where the sending module is configured to send a first binding request to a server by using a first link, and send a second binding request to the server by using a second link, where at least two links are established between the client and the server, the first link is one link in the at least two links, the second link is a link other than the first link in the at least two links, the first binding request carries a first temporary identity ID, and the second binding request carries a second temporary ID;

the receiving module is configured to receive a first link session identity LSID sent by the server by using the first link, and receive a second LSID sent by the server by using the second link;

the sending module is further configured to send a first authentication request to the server by using the first link, and send a second authentication request to the server by using the second link, where the first authentication request includes the first LSID and first authentication information, and the second authentication request includes the second LSID and second authentication information;

the receiving module is further configured to receive a binding identity BID sent by the server by using the first link, and receive the BID sent by the server by using the second link; and the link joint-using module is configured to jointly use, when the client needs to send data packets, the first link and the second link to send the to-be-sent data packets, where extension headers of the to-be-sent data packets carry the BID.

With reference to the eighth aspect, in a first possible implementation manner of the eighth aspect, the client further includes:

an IP obtaining module, configured to: after the receiving module receives the binding identity BID sent by the server by using the first link, and receives the BID sent by the server by using the second link, send an IP address request to the server by using the first link or the second link; and receive an IP address allocated by the server to the client.

According to a ninth aspect, an embodiment of the present invention provides a multi-link convergence system, including the server according to any one in the fifth aspect and the client according to any one in the sixth aspect, or the server according to any one in the seventh aspect and the client according to any one in the eighth aspect, where at least two links are established between the client and the server.

It can be seen from the foregoing technical solutions that, the embodiments of the present invention have the following advantages:

In some embodiments of the present invention, at least two links are established between a client and a server; the server first receives a first binding request sent by the client by using a first link; then the server sends a first LSID to the client by using the first link; then the server receives a first authentication request sent by the client by using the first link, and performs authentication on the first link according to the received first authentication request; when the server authenticates the first link successfully, the server sends a BID to the client by using the first link; then the server receives a second binding request sent by the client by using a second link; the server sends a second LSID to the client by using the second link; then the server receives a second authentication request sent by the client by using the second link, and performs authentication on the second link according to the received second authentication request; when the server authenticates the second link successfully, the server sends a binding acknowledgement message to the client by using the second link; the client receives the binding acknowledgement message; and according to the binding acknowledgement message, the client jointly uses the first link and the second link to send to-be-sent data packets. Because the same BID is allocated to the first link and the second link that are established between the client and the server, by adding the BID to extension headers of the to-be-sent data packets, the client can jointly use multiple links to transmit the data packets. In this way, multi-link convergence can be implemented, and available bandwidth is increased.

In some embodiments of the present invention, at least two links are established between a client and a server; the server receives a first binding request sent by the client by using a first link, and receives a second binding request sent by the client by using a second link, where the first binding request carries a first temporary ID, and the second binding request carries a second temporary ID from the client; the server sends a first LSID to the client by using the first link, and sends a second LSID to the client by using the second link; the server receives a first authentication request sent by the client by using the first link, and receives a second authentication request sent by the client by using the second link, where the first authentication request includes the first LSID and first authentication information, and the second authentication request includes the second LSID and second authentication information; the server performs authentication on the first link according to the first authentication request, and performs authentication on the second link according to the second authentication request; and if both the first link and the second link are authenticated successfully, and the server determines that the first temporary ID and the second temporary ID are the same temporary ID, the server sends a BID to the client by using the first link, and sends the BID to the client by using the second link, so that the client can use both the first link and the second link to send to-be-sent data packets, where extension headers of the to-be-sent data packets carry the BID. Because the same BID is allocated to the first link and the second link that are established between the client and the server, by adding the BID to extension headers of the to-be-sent data packets, the client can jointly use multiple links to transmit the data packets. In this way, multi-link convergence can be implemented, and available bandwidth is increased.

BRIEF DESCRIPTION OF DRAWINGS

FIG. 5-*a* is a schematic diagram of an application scenario of a multi-link convergence method according to an embodiment of the present invention;

FIG. 5-*b* is a schematic diagram of an implementation manner in which a header of a data packet in a data link layer is extended according to an embodiment of the present invention;

FIG. 5-*c* is a schematic diagram of an interaction process between a client and a server in an application scenario of a multi-link convergence method according to an embodiment of the present invention;

FIG. 6-*a* is a schematic structural diagram of a server according to an embodiment of the present invention;

FIG. 6-*b* is a schematic structural diagram of another server according to an embodiment of the present invention;

FIG. 6-*c* is a schematic structural diagram of another server according to an embodiment of the present invention;

FIG. 6-*d* is a schematic structural diagram of another server according to an embodiment of the present invention;

FIG. 7-*a* is a schematic structural diagram of a client according to an embodiment of the present invention;

FIG. 7-*b* is a schematic structural diagram of another client according to an embodiment of the present invention;

FIG. 7-*c* is a schematic structural diagram of a link joint-using module according to an embodiment of the present invention;

FIG. 7-*d* is a schematic structural diagram of another client according to an embodiment of the present invention;

FIG. 8-*a* is a schematic structural diagram of another server according to an embodiment of the present invention;

FIG. 8-*b* is a schematic structural diagram of another server according to an embodiment of the present invention;

FIG. 8-*c* is a schematic structural diagram of another server according to an embodiment of the present invention;

FIG. 9-*a* is a schematic structural diagram of another client according to an embodiment of the present invention;

FIG. 9-*b* is a schematic structural diagram of another client according to an embodiment of the present invention;

FIG. 9-*c* is a schematic structural diagram of a link joint-using module according to an embodiment of the present invention;

FIG. 9-*d* is a schematic structural diagram of another client according to an embodiment of the present invention;

FIG. 10 is a schematic structural diagram of a multi-link convergence system according to an embodiment of the present invention;

DESCRIPTION OF EMBODIMENTS

Embodiments of the present invention provide a multi-link convergence method, a server, a client, and a system, which are used to implement multi-link convergence and increase available bandwidth.

To make the invention objectives, features, and advantages of the present invention clearer and more comprehensible, the following clearly and completely describes the technical solutions in the embodiments of the present invention with reference to the accompanying drawings in the embodiments of the present invention. Apparently, the embodiments described in the following are merely some but not all of the embodiments of the present invention. All other embodiments obtained by a person skilled in the art based on the embodiments of the present invention shall fall within the protection scope of the present invention.

In the specification, claims, and accompanying drawings of the present invention, the terms "include", "contain" and any other variants mean to cover the non-exclusive inclusion, so that a process, method, system, product, or device that includes a list of units is not necessarily limited to those units, but may include other units not expressly listed or inherent to such a process, method, system, product, or device.

The embodiments are hereinafter described in detail separately.

Figure 1:
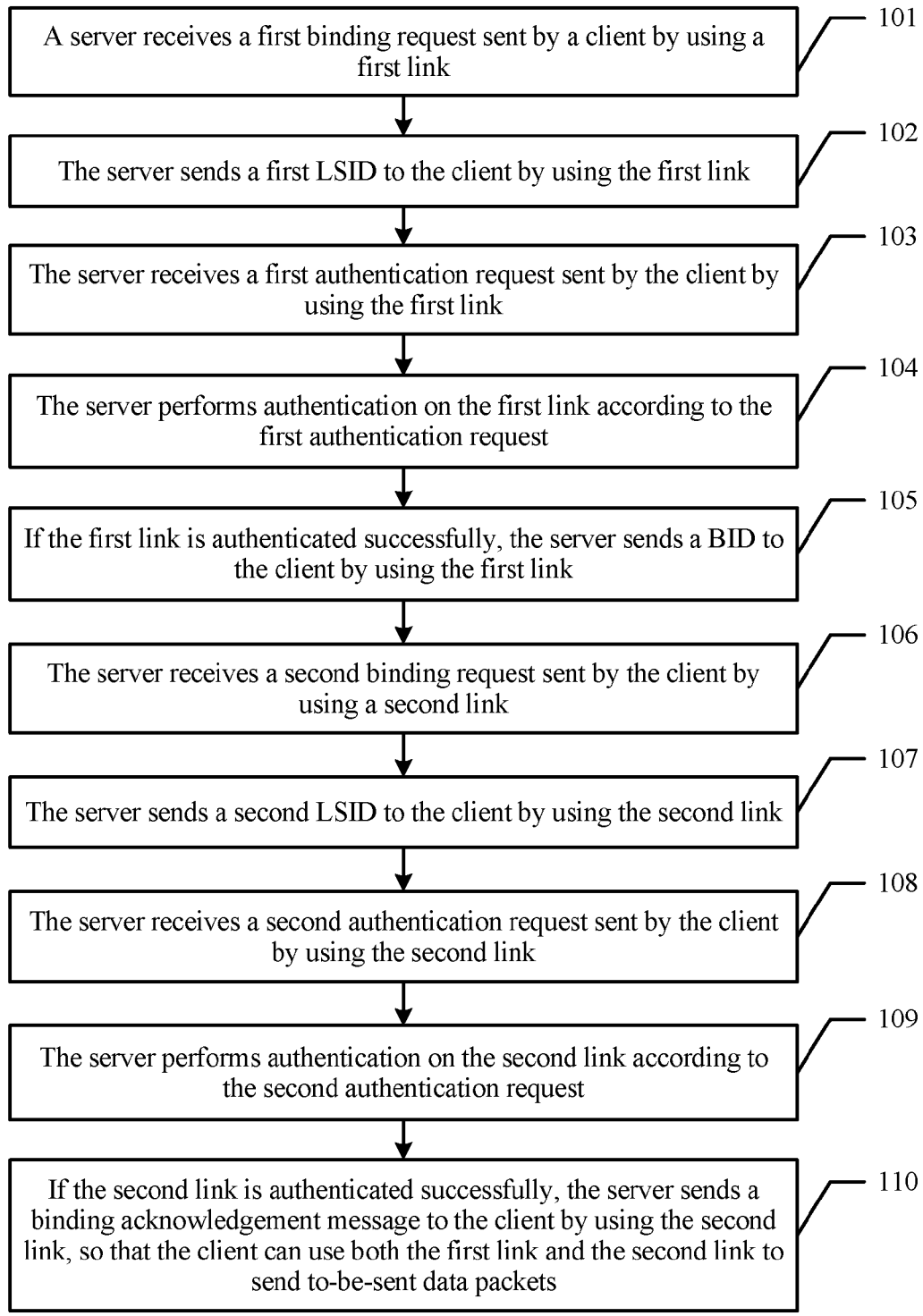
FIG. 1 is a schematic block flow diagram of a multi-link convergence method according to an embodiment of the present invention.

An embodiment of a multi-link convergence method according to the present invention may be applied to a processing method in which at least two links between a server and a client need to be converged. Referring to FIG. 1, first, a multi-link convergence method provided by an embodiment of the present invention is described from a perspective of a server side, and specifically may include the following steps.

101. A server receives a first binding request sent by a client by using a first link.

At least two links are established between the client and the server, and the first link is one link in the at least two links.

In the embodiment of the present invention, for highly efficient transmission of data packets between the server and the client, at least two links may be established between the server and the client. If the links may be jointly used to transmit data packets, efficiency of transmitting data packets between the server and the client is improved greatly. To jointly use the links, it is necessary to converge multiple links. In the embodiment of the present invention, joint use of the first link and a second link in the at least two links established between the server and the client is described in detail. For joint use of other links between the client and the server, refer to the process of jointly using the first link and the second link. First, the client sends the first binding request to the server by using the first link, and the server may receive, by using the first link, the first binding request sent by the client. Specifically, if the client has not obtained an IP address of the server, the client may send the first binding request in broadcast mode by using the first link. The server may learn, according to the first binding request, that the first link needs to be jointly used with other links between the server and the client.

In the embodiment of the present invention, each link established between the client and the server may be specifically a link that uses an access network to implement communication between the client and the server. In an actual application, specifically, two or more than two links may be established between the client and the server, and which access network is used for establishing a link in the at least two links may be determined according to an actual application scenario. Specifically, convergence of multiple links in broadband network access may include links of multiple types of access networks such as multiple types of digital subscriber lines (x Digital Subscriber Line, xDSL), a cable of a cable television (Cable), a fiber, wireless fidelity (Wireless-Fidelity, WiFi), an Ethernet, a second generation mobile communications technology (Second Generation mobile communication technology, 2G), a third generation mobile communications technology (3rd-Generation mobile communication technology, 3G), and a fourth generation mobile communications technology (the 4 Generation mobile communication technology, 4G). Generally, to maximally ensure coverage of a network, multiple links may be established between the client and the server, and each link may be implemented by using an access network. Multiple links may be established by using multiple access networks and used to transmit data packets between the client and the server.

102. The server sends a first link session identity (Link Session Identity, LSID) to the client by using the first link.

In the embodiment of the present invention, the server receives, by using the first link, the first binding request sent by the client. The LSID allocated by the server to the first link is the first LSID. Then the server sends the first LSID to the client by using the first link, and the client receives, by using the first link, the first LSID returned by the server. It may be understood that, if the server receives a binding request sent by the client by using another link, the server also needs to allocate an LSID to the another link between the client and the server, and an LSID allocated by the server to each link is different.

103. The server receives a first authentication request sent by the client by using the first link.

The first authentication request includes the first LSID and first authentication information.

In the embodiment of the present invention, after the client receives, from the server by using the first link, the first LSID allocated by the server to the first link, the client generates the first authentication request for the first link. The client adds the first LSID and the first authentication information to the first authentication request, where the first authentication information is user information that needs to be used when the client requests the server to perform authentication on the first link. For example, the first authentication information may include a user name and a password for the first link. After the client generates the first authentication request, the client sends the first authentication request to the server by using the first link. The server receives the first authentication request sent by the client by using the first link, and may parse the first authentication request to obtain the first LSID and the first authentication information that are added by the client.

104. The server performs authentication on the first link according to the first authentication request.

In the embodiment of the present invention, the client requests the server to perform authentication on the first link. The server parses the first authentication request sent by the client to obtain the first LSID and the first authentication information. The base station may use the first LSID and the first authentication information to perform authentication on the first link. If the server authenticates the first link successfully, each step subsequently described in the embodiment of the present invention may continue to be performed. If the server fails to authenticate the first link, the server may reply to the client that the first link cannot be jointly used with other links between the server and the client.

In some embodiments of the present invention, the server performs authentication on the first link according to the first authentication request in multiple implementation manners. For example, the server may verify the first LSID, to verify whether the first LSID is the LSID allocated by the server to the first link. If the server determines that the first LSID is the LSID allocated by the server to the first link, the server may continue to verify the first authentication information, to verify whether the user name and the password that are carried in the first authentication information are correct. When both the user name and the password are correct, the server may authenticate the first link successfully. If the server determines that the first LSID carried in the first authentication request is not allocated by the server to the first link, the server fails to authenticate the first link. If the server determines that the user name and the password that are carried in the first authentication information are incorrect, the server may fail to authenticate the first link. For another example, after the server verifies whether the first LSID comes from a legal source and whether the user name and the password are correct, the server may further set binding permission for each link between the client and the server. If the server sets binding permission for the first link, the server may continue to determine whether the first LSID comes from a legal source and whether the user name and the password are correct. Further, when the first LSID comes from a legal source and both the user name and the password are correct, the server may authenticate the first link successfully. If the server does not set binding permission for the first link, the server may fail to authenticate the first link, and does not need to further verify whether the first LSID comes from a legal source and whether the user name and the password are correct.

In some application scenarios of the present invention, for an authentication request phase, the client needs to send an identity of the client to the server. In this phase, a security verification manner is used to prevent a third party from stealing data or masquerading as a client to take over a connection to the server. A process of performing authentication on the first link by the server may be completed by using an authentication protocol. For example, the server uses the Password Authentication Protocol (Password Authentication Protocol, PAP) and/or the Challenge Handshake Authentication Protocol (Challenge Handshake Authentication Protocol, CHAP) to perform authentication on the first link.

If the server uses PAP to perform authentication on the link, the server may obtain the user name and the password from the first authentication request, and PAP returns user information in plaintext. If the server uses CHAP to perform authentication on the link, the server sends a challenge password to the client, where the challenge password includes the first LSID and any generated challenge string. The client needs to return the user name and an encrypted challenge password, the first LSID, and the user password by using a message digest algorithm 5 (Message-Digest Algorithm 5, MD5) one-way hash algorithm, where the user name is sent in a non-hash manner. CHAP generates any challenge string for each verification to prevent a replay attack. In a whole connection process, CHAP may repeatedly send a challenge password to the client aperiodically.

It should be noted that, in the embodiment of the present invention, in sort that the client can jointly use multiple links, the client needs to send an authentication request to the server, and the server further needs to perform authentication on the links between the client and the server, so as to ensure legality of each link. Before completion of authentication, transmission of data packets is not performed, and therefore, security of the data packets may be ensured. A link that is authenticated successfully may be used to transmit a data packet between the client and the server, and a link that fails to be authenticated cannot be used to transmit a data packet.

105. If the first link is authenticated successfully, the server sends a binding identity BID (Bind Identity, BID) to the client by using the first link.

In the embodiment of the present invention, after the server authenticates the first link successfully, the server acknowledges that the first link may be used jointly with other links. The server generates a BID, where the BID is an identity that is allocated by the server to the client, and may be jointly used by multiple links. The BID generated by the server is also stored on the server side. The server sends the BID to the client by using the first link. The client may obtain the BID by using the first link, and therefore, the client may use the BID to implement convergence of multiple links.

In the embodiment of the present invention, after the server authenticates the first link successfully, the server generates the BID for the first link, where the BID may be used to identify binding relationships between the first link and other links between the server and the client. Binding IDs generated by the server for bindings between different links are different. Specifically, after the client receives, by using the first link, the BID sent by the server, the client may use the BID in a data link layer of a to-be-sent data packet. Each BID identifies a group of multiple links that use multiple bound links to jointly transmit data packets. Therefore, multiple links are jointly used to transmit data packets, and convergence of multiple links may be completed. When to-be-sent data packets need to be transmitted by using both multiple links, each to-be-sent data packet needs to carry the BID. Further, in each to-be-sent data packet, the BID may be encapsulated in a data link layer of the data packet. The multi-link convergence method provided by the embodiment of the present invention may be implemented in a data link layer, namely, a layer-2 network in a network model. By generating the BID, the server may acknowledge binding relationships between multiple links. When the client needs to transmit a data packet, the client may directly add the BID to the data packet. The BID may be encapsulated in a data link layer of the data packet for transmission. For example, a data link layer protocol involved in the embodiment of the present invention may include the Virtual Local Area Network (Virtual Local Area Network, VLAN) protocol, the Point-to-Point Protocol (Point-to-Point Protocol, PPP), and other layer-2 protocols.

In some embodiments of the present invention, if the client requests the server to bind links of the PPP protocol in the data link layer protocol, step 101 in which the server receives the first binding request that is sent by the client by using the first link may specifically include the following step:

The server receives a first Point-to-Point Protocol over Ethernet (Point-to-Point Protocol over Ethernet, PPPoE) request sent by the client by using the first link.

That is, the client may use the Point-to-Point Protocol (Point-to-Point Protocol, PPP), so that the client implements convergence of data packets at the data link layer. The client sends the first PPPoE request on an Ethernet port by using the first link. The server may receive the first PPPoE request on an Ethernet port by using the first link between the client and the server. The server learns, according to the first PPPoE request, that the first link needs to be jointly used with other links between the server and the client.

106. The server receives a second binding request sent by the client by using a second link.

The second binding request carries the BID, and the second link is a link other than the first link in the at least two links.

In the embodiment of the present invention, after the server authenticates the first link successfully, the server sends the BID to the client by using the first link. The client may obtain the BID, where the BID is an identity for using both the first link and other links between the server and the client. If the client decides to use a link to be jointly used with the first link, the client adds the BID to a binding request sent on the determined link. Assuming that the second link is a link other than the first link in the at least two links, if the client determines that the second link and the first link need to be used jointly, the client needs to add the BID to the second binding request when sending the second binding request to the server by using the second link. The server may receive the second binding request by using the second link. If the server obtains, by parsing, the BID that is added to the second binding request by the client, the server determines that the client is asking the server whether the second link and the first link can be jointly used.

107. The server sends a second LSID to the client by using the second link.

In the embodiment of the present invention, the server receives, by using the second link, the second binding request sent by the client. The LSID allocated by the server to the second link is the second LSID. Then the server sends the second LSID to the client by using the second link, and the client receives, by using the second link, the second LSID returned by the server.

108. The server receives a second authentication request sent by the client by using the second link.

The second authentication request includes the second LSID and second authentication information.

In the embodiment of the present invention, after the client receives, from the server by using the second link, the second LSID allocated by the server to the second link, the client generates the second authentication request for the second link. The client adds the second LSID and the second authentication information to the second authentication request, where the second authentication information is user information that needs to be used when the client requests the server to perform authentication on the second link. For example, the second authentication information may include a user name and a password for the second link. After the client generates the second authentication request, the client sends the second authentication request to the server by using the second link. The server receives the second authentication request sent by the client by using the second link, and may parse the second authentication request to obtain the second LSID and the second authentication information that are added by the client.

109. The server performs authentication on the second link according to the second authentication request.

In the embodiment of the present invention, the client requests the server to perform authentication on the second link. The server parses the second authentication request sent by the client to obtain the second LSID and the second authentication information. The base station may use the second LSID and the second authentication information to perform authentication on the second link. If the server authenticates the second link successfully, each step subsequently described in the embodiment of the present invention may continue to be performed. If the server fails to authenticate the second link, the server may reply to the client that the second link cannot be jointly used.

In some embodiments of the present invention, the server performs authentication on the second link according to the second authentication request in multiple implementation manners. For example, the server may verify the second LSID, to verify whether the second LSID is the LSID allocated by the server to the second link. If the server determines that the second LSID is the LSID allocated by the server to the second link, the server may continue to verify the second authentication information, to verify whether the user name and the password that are carried in the second authentication information are correct. When both the user name and the password are correct, the server may authenticate the second link successfully. If the server determines that the second LSID carried in the second authentication request is not allocated by the server to the second link, the server fails to authenticate the second link. If the server determines that the user name and the password that are carried in the second authentication information are incorrect, the server may fail to authenticate the second link. For another example, after the server verifies whether the second LSID comes from a legal source and whether the user name and the password are correct, the server may further set binding permission for each link between the client and the server. If the server sets binding permission for the second link, the server may continue to determine whether the second LSID comes from a legal source and whether the user name and the password are correct. Further, when the second LSID comes from a legal source and both the user name and the password are correct, the server may authenticate the second link successfully. If the server does not set binding permission for the second link, the server may fail to authenticate the second link, and does not need to further verify whether the second LSID comes from a legal source and whether the user name and the password are correct.

110. If the second link is authenticated successfully, the server sends a binding acknowledgement message to the client by using the second link, so that the client can use both the first link and the second link to send to-be-sent data packets.

Extension headers of the to-be-sent data packets carry the BID.

In the embodiment of the present invention, after the server authenticates the second link successfully, the server acknowledges that the second link may be jointly used with the first link. That is, the server acknowledges that an extension header of a data packet sent on the second link by the client may carry the BID allocated by the server to the first link. Because an extension header of a data packet sent on the first link by the client carries the BID, after the server receives multiple data packets by using the first link and the second link, the server may confirm, according to the same BID carried in each data packet, that the received data packets are data packets that are sent by the same client by using both the first link and the second link. Specifically, when the server acknowledges that the second link may be jointly used with the first link, the server sends the binding acknowledgement message to the client by using the second link. The client may learn, according to the binding acknowledgement message, that joint use of the second link and the first link has been acknowledged by the server.

Therefore, the client may use both the first link and the second link to send the to-be-sent data packets, where the extension headers of the to-be-sent data packets carry the BID.

It should be noted that, in the foregoing embodiment of the present invention, if only two links are established between the server and the client (which are respectively the first link and the second link), both links between the server and the client are jointly used, and joint use of both links between the server and the client may be implemented according to the description of steps 101 to 110. If only three links or more links (not limited to the first link and the second link) are established between the server and the client, some links between the server and the client are jointly used, and joint use of all links between the server and the client may be implemented according to the description of steps 101 to 110. In some embodiments of the present invention, when a third link is further included in addition to the first link and the second link between the server and the client, after step 110 in which the server sends the binding acknowledgement message to the client by using the second link, the multi-link convergence method provided by the embodiment of the present invention may further include the following steps:

A1. The server receives a third binding request sent by the client by using a third link, where the third binding request carries the BID, and the third link is a link other than the first link and the second link in the at least two links.

A2. The server sends a third LSID to the client by using the third link.

A3. The server receives a third authentication request sent by the client by using the third link, where the third authentication request includes the third LSID.

A3. The server performs authentication on the third link according to the third authentication request.

A4. If the third link is authenticated successfully, the server sends a binding acknowledgement message to the client by using the third link, so that the client determines that the first link, the second link, and the third link can be jointly used to send to-be-sent data packets, where extension headers of the to-be-sent data packets carry the BID.

That is, when another link in addition to the first link and the second link is further included between the server and the client, the another link may be processed according to a manner of processing the second link as described in the foregoing step 106 to step 110. For example, steps A1 to A4 performed for the third link are similar to steps 106 to 110 in the foregoing embodiment, and are not further described herein.

In some embodiments of the present invention, after step 110 in which the server sends the binding acknowledgement message to the client by using the second link, the multi-link convergence method provided by the embodiment of the present invention may further include the following steps:

B1. The server receives an IP address request sent by the client by using the first link or the second link.

B2. The server allocates an IP address to the client, and sends the IP address to the client.

That is, when the server sends the BID to the client by using the first link, the client may obtain the IP address of the server, but the client cannot know the IP address of the client yet. The client may send the IP address request by using the first link or the second link. The server may allocate the IP address to the client, and the server may send the IP address to the client by using the first link or the second link. For an implementation process in which the server allocates the IP address to the client, refer to the description in the prior art. Details are not further described herein.

Further, in some embodiments of the present invention, after step B1 in which the server allocates the IP address to the client, and sends the IP address to the client, the multi-link convergence method provided by the embodiment of the present invention may further include the following steps:

C1. The server receives, by using the first link, a first data packet sent by the client, and the server receives, by using the second link, a second data packet sent by the client, where an extension header of the first data packet carries the BID and a first packet sequence number, an extension header of the second data packet carries the BID and a second packet sequence number, and source IP addresses in the first data packet and the second data packet are the IP address of the client.

C2. The server determines, according to the same BID carried in the first data packet and the second data packet, that the first data packet and the second data packet are data packets received by using both the first link and the second link.

C3. The server sorts the first data packet and the second data packet according to a time sequence relationship between the first packet sequence number and the second packet sequence number, and recombines the sorted first data packet and second data packet to obtain a data packet combination.

C4. The server sends the data packet combination to a destination device.

That is, in the embodiment of the present invention, after the client obtains the IP address from the server, the client may jointly transmit multiple data packets on the client side on the first link and the second link. It may be understood that, joint transmission indicates that the client jointly uses the first link and the second link to transmit multiple data packets. An implementation manner that may exist include: the client transmits a part of data packets by using the first link, and the client transmits another part of data packets by using the second link.

In step C1, the client sends the first data packet by using the first link and sends the second data packet by using the second link, where the client adds the BID and the first packet sequence number to the first data packet, and adds the BID and the second packet sequence number to the second data packet. Then step C2 is performed: the server determines, according to the same BID carried in the first data packet and the second data packet, that the first data packet and the second data packet are data packets received by using both the first link and the second link. Because multiple data packets carry the same BID, the server may confirm that the data packets are data packets that are sent by the client by using both multiple links. Then step C3 is performed: the server sorts the first data packet and the second data packet according to the time sequence relationship between the first packet sequence number and the second packet sequence number, and recombines the sorted first data packet and second data packet to obtain the data packet combination. Because different channel conditions may exist in the first link and the second link, a time sequence of arrival of the first data packet and the second data packet at the server may be different from an original time sequence of the first data packet and the second data packet on the client. Therefore, in the embodiment of the present invention, the client allocates, according to the original time sequence of the first data packet and the second data packet on the client, a packet sequence number to the first data packet and the second data packet respectively, where the client allocates the first packet sequence number to the first data packet and allocates the second packet sequence number to the second data packet. The server resorts the first data packet and the second data packet according to the time sequence relationship between the packet sequence numbers, and recombines the sorted first data packet and second data packet to obtain the data packet combination. Finally, step C4 is performed: the server sends the data packet combination to the destination device, where the destination device refers to a device to which the client needs to send the first data packet and the second data packet. For example, the destination device may be an Internet server. In this case, after the client sends the first data packet and the second data packet to the server, the server recombines the first data packet and the second data packet, and then sends the data packet combination to the Internet server.

It should be noted that, for uplinks between the server and the client, after the client completes convergence of multiple links, the client may jointly use the multiple links to transmit data packets. The client adds the BID and packet sequence numbers to extension headers of the sent data packets, where the BID is used to identify which data packets are sent by using multiple converged links, and the packet sequence numbers are sequence numbers of multiple data packets and are used to identify a time sequence of the multiple data packets. In addition, the data packets further carry the IP address of the client, so that a destination address to which a downlink data packet should be sent is clear when the data packet is sent on a downlink between the server and the client. After the server receives the multiple data packets by using the multiple links between the client and the server, the server may identify a corresponding packet sequence number of each data packet in the extension header of each data packet. The server needs to recombine all the received data packets according to values of the packet sequence numbers. Because the client allocates a packet sequence number to each data packet when sending the multiple data packets by using the multiple links, the server may determine, according to the packet sequence number carried in the extension header of the data packet, a position in which the data packet should be combined.

In the embodiment of the present invention, after the server performs authentication on the second link, if the second link is a legal user, the second link is authenticated successfully. When the second link is authenticated successfully, the server may send a binding acknowledgement message to the client. For an uplink from the client to the server, after the server sends the BID to the client, the client may add the binding identity to an extension header of a to-be-sent data packet. When the server receives multiple data packets by using multiple links, the server determines, according to the BID carried in each data packet, that the data packets are sent by using multiple bound links. An extension header (Expand-Head, E-Head for short) may be added to a data link layer in a to-be-sent data packet. The extension header is an additional extension to an original header in the data link layer in the data packet, and is used to store the binding identity and a packet sequence number. The server and the client may obtain, by identifying extension headers of data packets, the binding identity carried in the data packets, and therefore determine that the multiple data packets carrying the binding identity are sent by using multiple converged links.

In the embodiment of the present invention, after the multiple links are all authenticated successfully, the server sends the binding identity to the client. By carrying the binding identity in the extension headers of the to-be-sent data packets, the multiple links may be jointly used to transmit the data packets. In this way, convergence of the multiple links is implemented, and available bandwidth is increased. In addition, the server and the client do not need to perform separate additional processing on the data packets, and therefore, packet processing efficiency may be ensured.

In some embodiments of the present invention, after step 110 in which the server sends the binding acknowledgement message to the client by using the second link, the multi-link convergence method provided by the embodiment of the present invention may further include the following step:

The server periodically maintains a link status of each link established between the client and the server.

The server needs to maintain each link between the client and the server periodically to ensure smoothness of the link. Specifically, the server may send a heartbeat packet periodically by using the link between the client and the server, to detect whether the link is smooth. The heartbeat packet is a command word that is defined by the client or the server and notifies a status of the client or the server to the peer periodically, and is sent between the client and the server at a certain time interval. For example, the server may send a heartbeat packet to the client at an interval of one second. If the server finds, by periodically maintaining the link status, that a link breaks, a link connection needs to be reestablished. Specifically, the foregoing method in the embodiment of the present invention may be performed again to complete re-establishment of the link.

As can be known from the description of the present invention in the foregoing embodiment, at least two links are established between a client and a server; the server first receives a first binding request sent by the client by using a first link; then the server sends a first LSID to the client by using the first link; then the server receives a first authentication request sent by the client by using the first link, and performs authentication on the first link according to the received first authentication request; when the server authenticates the first link successfully, the server sends a BID to the client by using the first link; then the server receives a second binding request sent by the client by using a second link; the server sends a second LSID to the client by using the second link; then the server receives a second authentication request sent by the client by using the second link, and performs authentication on the second link according to the received second authentication request; when the server authenticates the second link successfully, the server sends a binding acknowledgement message to the client by using the second link; the client receives the binding acknowledgement message; and according to the binding acknowledgement message, the client jointly uses the first link and the second link to send to-be-sent data packets. Because the same BID is allocated to the first link and the second link that are established between the client and the server, by adding the BID to extension headers of the to-be-sent data packets, the client can jointly use multiple links to transmit the data packets. In this way, multi-link convergence can be implemented, and available bandwidth is increased.

Figure 2:
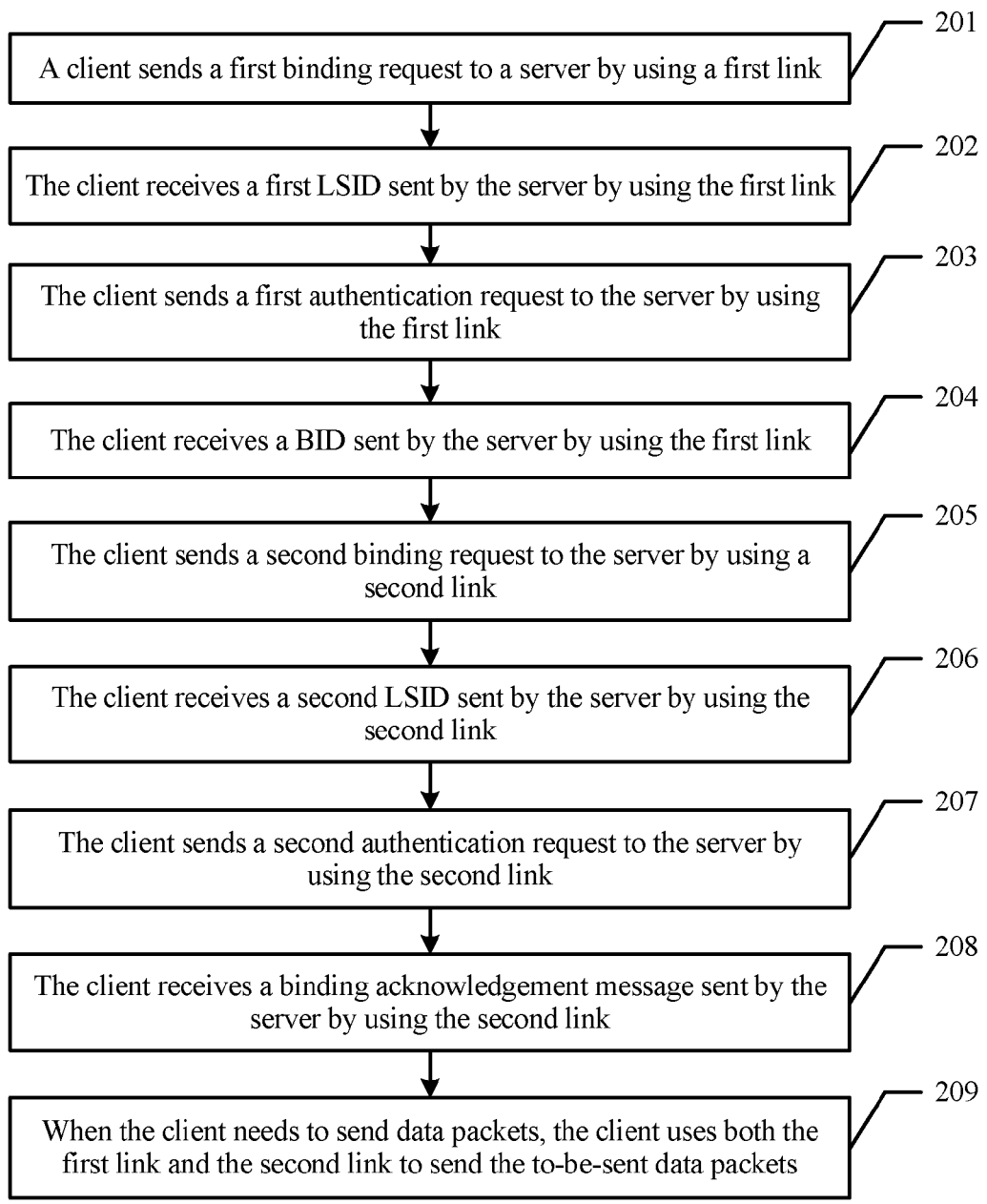
FIG. 2 is a schematic block flow diagram of another multi-link convergence method according to an embodiment of the present invention.

In the foregoing embodiment, a multi-link convergence method provided by the embodiment of the present invention is described from a perspective of a server. The following description is provided from a perspective of a peer of the server, namely, a client. Referring to FIG. 2, a multi-link convergence method provided by an embodiment of the present invention may specifically include the following steps.

201. A client sends a first binding request to a server by using a first link.

At least two links are established between the client and the server, and the first link is one link in the at least two links.

In the embodiment of the present invention, for highly efficient transmission of data packets between the server and the client, at least two links may be established between the server and the client. If the links may be jointly used to transmit data packets, efficiency of transmitting data packets between the server and the client is improved greatly. To jointly use the links, it is necessary to converge multiple links. In the embodiment of the present invention, joint use of the first link and a second link in the at least two links established between the server and the client is described in detail. For joint use of other links between the client and the server, refer to the process of jointly using the first link and the second link. First, the client sends the first binding request to the server by using the first link, and the server may receive, by using the first link, the first binding request sent by the client. Specifically, if the client has not obtained an IP address of the server, the client may send the first binding request in broadcast mode by using the first link. The server may learn, according to the first binding request, that the first link needs to be jointly used with other links between the server and the client.

202. The client receives a first LSID sent by the server by using the first link.

In the embodiment of the present invention, the server receives, by using the first link, the first binding request sent by the client. The LSID allocated by the server to the first link is the first LSID. Then the server sends the first LSID to the client by using the first link, and the client receives, by using the first link, the first LSID returned by the server. It may be understood that, if the server receives a binding request sent by the client by using another link, the server also needs to allocate an LSID to the another link between the client and the server, and an LSID allocated by the server to each link is different.

203. The client sends a first authentication request to the server by using the first link.

The first authentication request includes the first LSID and first authentication information.

In the embodiment of the present invention, after the client receives, from the server by using the first link, the first LSID allocated by the server to the first link, the client generates the first authentication request for the first link. The client adds the first LSID and the first authentication information to the first authentication request, where the first authentication information is user information that needs to be used when the client requests the server to perform authentication on the first link.

In some embodiments of the present invention, the client may specifically negotiate an authentication mode with the server by using the IP Control Protocol (IP Control Protocol, IPCP).

The client negotiates an authentication mode on the first link with the server by using the IPCP protocol, and subsequently in the embodiment, the client may also negotiate authentication on the second link and a third link with the server by using IPCP. For authentication performed by the server with the client, refer to the description in the foregoing embodiment.

204. The client receives a BID sent by the server by using the first link.

In the embodiment of the present invention, after the server authenticates the first link successfully, the server acknowledges that the first link may be used jointly with other links. The server generates a BID, where the BID is an identity that is allocated by the server to the client, and may be jointly used by multiple links. The BID generated by the server is also stored on the server side. The server sends the BID to the client by using the first link. The client may obtain the BID by using the first link.

205. The client sends a second binding request to the server by using a second link.

The second binding request carries the BID, and the second link is a link other than the first link in the at least two links.

In the embodiment of the present invention, after the server authenticates the first link successfully, the server sends the BID to the client by using the first link. The client may obtain the BID, where the BID is an identity for using both the first link and other links between the server and the client. If the client decides to use a link to be jointly used with the first link, the client adds the BID to a binding request sent on the determined link. Assuming that the second link is a link other than the first link in the at least two links, if the client determines that the second link and the first link need to be used jointly, the client needs to add the BID to the second binding request when sending the second binding request to the server by using the second link. The server may receive the second binding request by using the second link. If the server obtains, by parsing, the BID that is added to the second binding request by the client, the server determines that the client is asking the server whether the second link and the first link can be jointly used.

206. The client receives a second LSID sent by the server by using the second link.

In the embodiment of the present invention, the server receives, by using the second link, the second binding request sent by the client. The LSID allocated by the server to the second link is the second LSID. Then the server sends the second LSID to the client by using the second link, and the client receives, by using the second link, the second LSID returned by the server.

207. The client sends a second authentication request to the server by using the second link.

The second authentication request includes the second LSID and second authentication information.

In the embodiment of the present invention, after the client receives, from the server by using the second link, the second LSID allocated by the server to the second link, the client generates the second authentication request for the second link. The client adds the second LSID and the second authentication information to the second authentication request, where the second authentication information is user information that needs to be used when the client requests the server to perform authentication on the second link.

208. The client receives a binding acknowledgement message sent by the server by using the second link.

In the embodiment of the present invention, when the server acknowledges that the second link may be jointly used with the first link, the server sends the binding acknowledgement message to the client by using the second link. The client may learn, according to the binding acknowledgement message, that joint use of the second link and the first link has been acknowledged by the server. Therefore, the client may use both the first link and the second link to send to-be-sent data packets, where extension headers of the to-be-sent data packets carry the BID.

209. When the client needs to send data packets, the client jointly uses the first link and the second link to send the to-be-sent data packets.

Extension headers of the to-be-sent data packets carry the BID.

The multi-link convergence method provided by the embodiment of the present invention may be implemented in a data link layer, namely, a layer-2 network in a network model. Specifically, the BID may be encapsulated in a data link layer of a to-be-sent data packet by the client. By generating the BID, the server may acknowledge binding relationships between multiple links. When the client needs to transmit a data packet, the client may directly add the BID to the data packet. The BID may be encapsulated in a data link layer of the data packet for transmission. For example, a data link layer protocol involved in the embodiment of the present invention may include VLAN, PPP, and other layer-2 protocols.

It should be noted that, when a third link is further included in addition to the first link and the second link between the server and the client, after step 208 in which the client receives the binding acknowledgement message sent by the server by using the second link, the multi-link convergence method provided by the embodiment of the present invention may further include the following steps.

D1. The client sends a third binding request to the server by using a third link, where the third binding request carries the BID, and the third link is a link other than the first link and the second link in the at least two links.

D2. The client receives a third LSID sent by the server by using the third link.

D3. The client sends a third authentication request to the server by using the third link, where the third authentication request includes the third LSID.

D4. The client receives a binding acknowledgement message sent by the server by using the third link, so that the client can use all the first link, the second link, and the third link to send to-be-sent data packets, where extension headers of the to-be-sent data packets carry the BID.

That is, when another link in addition to the first link and the second link is further included between the server and the client, the another link may be processed according to a manner of processing the second link as described in the foregoing step 205 to step 208. For example, steps D1 to D4 performed for the third link are similar to steps 205 to 208 in the foregoing embodiment, and are not further described herein.

In some embodiments of the present invention, after step 208 in which the client receives the binding acknowledgement message sent by the server by using the second link, the multi-link convergence method provided by the embodiment of the present invention may further include the following steps.

E1. The client sends an IP address request to the server by using the first link or the second link.

E2. The client receives an IP address allocated by the server to the client.

That is, when the server sends the BID to the client by using the first link, the client may obtain the IP address of the server, but the client cannot know the IP address of the client yet. The client may send the IP address request by using the first link or the second link. The server may allocate the IP address to the client, and the server may send the IP address to the client by using the first link or the second link. For an implementation process in which the server allocates the IP address to the client, refer to the description in the prior art. Details are not further described herein.

Further, in some embodiments of the present invention, step 209 in which the client jointly uses the first link and the second link to send the to-be-sent data packets may specifically include the following steps.

F1. The client allocates, according to a time sequence relationship between a first data packet and a second data packet, a first packet sequence number to the first data packet and a second packet sequence number to the second data packet respectively.

F2. The client sends the first data packet to the server by using the first link, and sends the second data packet to the server by using the second link, where an extension header of the first data packet carries the BID and the first packet sequence number, an extension header of the second data packet carries the BID and the second packet sequence number, and source IP addresses in the first data packet and the second data packet are the IP address of the client.

In step F1, the client allocates, according to the time sequence relationship between the first data packet and the second data packet, the first packet sequence number to the first data packet and the second packet sequence number to the second data packet respectively. Then in step F2, the client sends the first data packet by using the first link, and sends the second data packet by using the second link, where the client adds the BID and the first packet sequence number to the first data packet, and adds the BID and the second packet sequence number to the second data packet. The server determines, according to the same BID carried in the first data packet and the second data packet, that the first data packet and the second data packet are data packets that are received by using both the first link and the second link. Because different channel conditions may exist in the first link and the second link, a time sequence of arrival of the first data packet and the second data packet at the server may be different from an original time sequence of the first data packet and the second data packet on the client. Therefore, in the embodiment of the present invention, the client allocates, according to the original time sequence of the first data packet and the second data packet on the client, a packet sequence number to the first data packet and the second data packet respectively, where the client allocates the first packet sequence number to the first data packet and allocates the second packet sequence number to the second data packet. The server may resort the first data packet and the second data packet according to the time sequence relationship between the packet sequence numbers.

In some embodiments of the present invention, after step 209 in which when the client needs to send data packets, the client jointly uses the first link and the second link to send the to-be-sent data packets, the multi-link convergence method provided by the embodiment of the present invention may further include the following step:

The client periodically maintains a link status of each link established between the client and the server.

That the client needs to maintain each link between the client and the server periodically includes maintaining link statuses of the first link and the second link to ensure smoothness of the links. Specifically, the client may send heartbeat packets periodically by using the first link and the second link between the client and the server, to detect whether the links are smooth. The heartbeat packet is a command word that is defined by the client or the server and notifies a status of the client or the server to the peer periodically, and is sent between the client and the server at a certain time interval. For example, the client may send a heartbeat packet to the server at an interval of one second. If the client finds, by periodically maintaining the link status, that a link breaks, a link connection needs to be reestablished. Specifically, the foregoing method in the embodiment of the present invention may be performed again to complete re-establishment of the link.

As can be known from the description of the present invention in the foregoing embodiment, at least two links are established between a client and a server; the client first sends a first binding request to the server by using a first link; then the client sends a first authentication request to the server by using the first link; when the server authenticates the first link successfully, the client may receive, by using the first link, a BID allocated by the server to the first link; then the client sends a second binding request to the server by using a second link; the client receives a second LSID; then the client sends a second authentication request to the server by using the second link; when the server authenticates the second link successfully, the client receives a binding acknowledgement message; and according to the binding acknowledgement message, the client jointly uses the first link and the second link to send to-be-sent data packets. Because the same BID is allocated to the first link and the second link that are established between the client and the server, by adding the BID to extension headers of the to-be-sent data packets, the client can jointly use multiple links to transmit the data packets. In this way, multi-link convergence can be implemented, and available bandwidth is increased.

Figure 3:
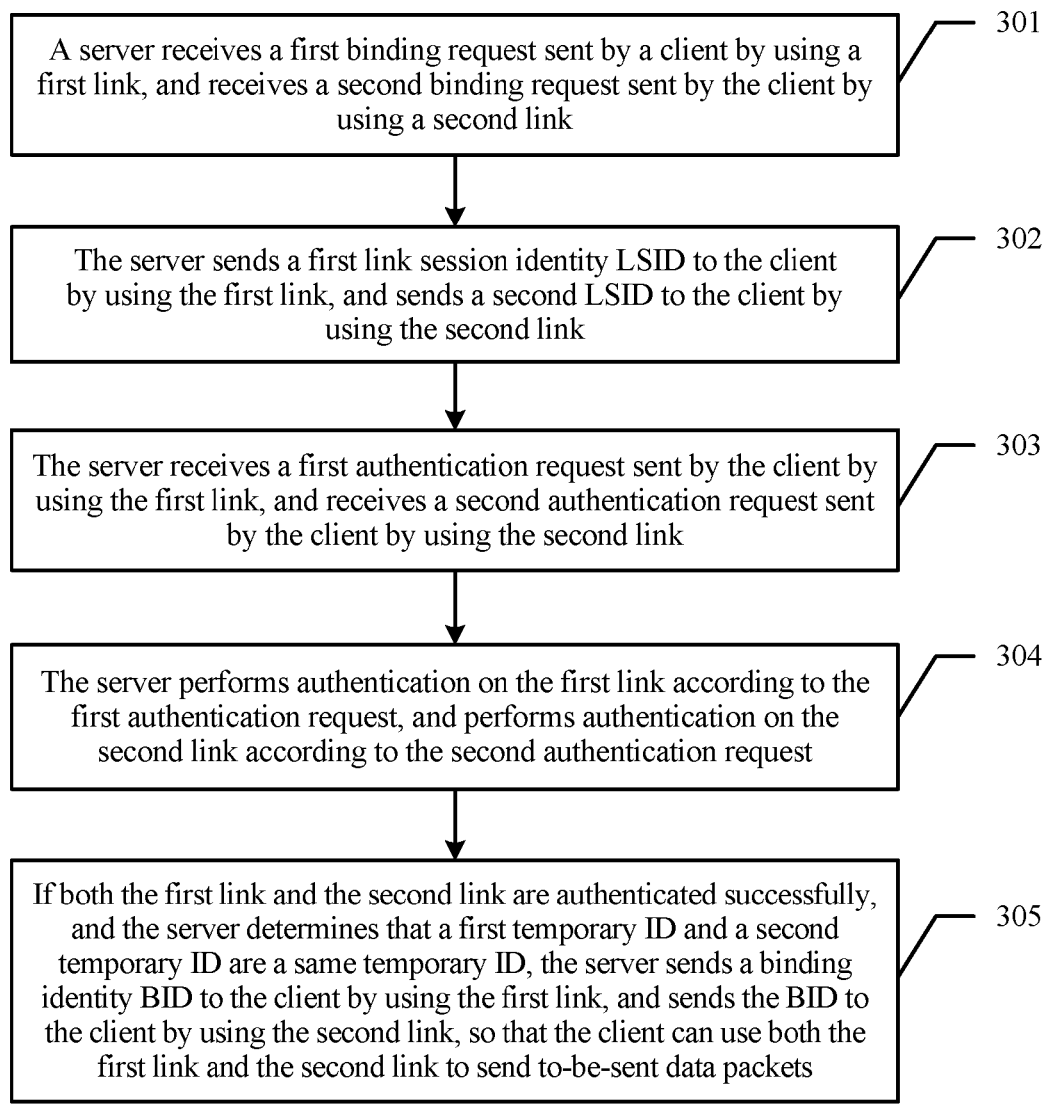
FIG. 3 is a schematic block flow diagram of another multi-link convergence method according to an embodiment of the present invention.

In the foregoing embodiment, a multi-link convergence method provided by the embodiment of the present invention is described. The following describes another multi-link convergence method provided by an embodiment of the present invention. First, the method is described in detail from a perspective of a server side. Referring to FIG. 3, a multi-link convergence method provided by an embodiment of the present invention may specifically include the following steps.

301. A server receives a first binding request sent by a client by using a first link, and receives a second binding request sent by the client by using a second link.

At least two links are established between the client and the server, the first link is one link in the at least two links, the second link is a link other than the first link in the at least two links, the first binding request carries a first temporary identity ID, and the second binding request carries a second temporary ID.

In the embodiment of the present invention, for highly efficient transmission of data packets between the server and the client, at least two links may be established between the server and the client. If the links may be jointly used to transmit data packets, efficiency of transmitting data packets between the server and the client is improved greatly. To jointly use the links, it is necessary to converge multiple links. In the embodiment of the present invention, joint use of the first link and the second link in the at least two links established between the server and the client is described in detail. For joint use of other links between the client and the server, refer to the process of jointly using the first link and the second link. First, the client sends the first binding request to the server by using the first link, and sends the second binding request by using the second link.

302. The server sends a first link session identity LSID to the client by using the first link, and sends a second LSID to the client by using the second link.

In the embodiment of the present invention, the server receives, by using the first link, the first binding request sent by the client, and receives the second binding request by using the second link. The LSID allocated by the server to the first link is the first LSID, and the LSID allocated to the second link is the second LSID. Then the server sends the first LSID to the client by using the first link, and sends the second LSID to the client by using the second link. The client receives, by using the first link, the first LSID returned by the server, and receives, by using the second link, the second LSID returned by the server. It may be understood that, if the server receives a binding request sent by the client by using another link, the server also needs to allocate an LSID to the another link between the client and the server, and an LSID allocated by the server to each link is different.

303. The server receives a first authentication request sent by the client by using the first link, and receives a second authentication request sent by the client by using the second link.

The first authentication request includes the first LSID and first authentication information, and the second authentication request includes the second LSID and second authentication information.

In the embodiment of the present invention, after the client receives, from the server by using the first link, the first LSID allocated by the server to the first link, and receives the second LSID by using the second link, the client generates the first authentication request for the first link. The client adds the first LSID and the first authentication information to the first authentication request. The client generates the second authentication request for the second link. The client adds the second LSID and the second authentication information to the second authentication request. The first authentication information is user information that needs to be used when the client requests the server to perform authentication on the first link, and the second authentication information is user information that needs to be used when the client requests the server to perform authentication on the second link.

304. The server performs authentication on the first link according to the first authentication request, and performs authentication on the second link according to the second authentication request.

In the embodiment of the present invention, the client requests the server to perform authentication on the first link and requests the server to perform authentication on the second link. The server parses the first authentication request sent by the client to obtain the first LSID and the first authentication information. The base station may perform authentication on the first link by using the first LSID and the first authentication information. The server parses the second authentication request sent by the client to obtain the second LSID and the second authentication information. The base station may perform authentication on the second link by using the second LSID and the second authentication information. Each step subsequently described in the embodiment of the present invention can continue to be performed only when the server authenticates the first link successfully and authenticates the second link successfully. If the server fails to authenticate at least one link in the first link and the second link, the server may reply to the client that the first link and the second link are jointly used. For the description of authentication on the first link and the second link by the server, refer to the description in the foregoing embodiment. Details are not further described herein.

305. If both the first link and the second link are authenticated successfully, and the server determines that a first temporary ID and a second temporary ID are a same temporary ID, the server sends a binding identity BID to the client by using the first link, and sends the BID to the client by using the second link, so that the client can use both the first link and the second link to send to-be-sent data packets.

Extension headers of the to-be-sent data packets carry the BID.

In the embodiment of the present invention, after the server authenticates the first link and the second link successfully, the server further needs to determine the first temporary ID carried in the first binding request and the second temporary ID carried in the second binding request. The server determines that the first temporary ID and the second temporary ID are the same temporary ID. The server acknowledges that the second link may be jointly used with the first link, that is, the server acknowledges that an extension header in a data packet sent on the second link by the client may carry the BID allocated by the server to the first link. Because an extension header in a data packet sent on the first link by the client carries the BID, after the server receives multiple data packets by using the first link and the second link, the server may confirm, according to the same BID carried in each data packet, that the received data packets are data packets that are sent by the same client by using both the first link and the second link. Specifically, when the server acknowledges that the second link may be jointly used with the first link, the server sends a binding acknowledgement message to the client by using the second link. The client may learn, according to the binding acknowledgement message, that joint use of the second link and the first link has been acknowledged by the server. Therefore, the client may use both the first link and the second link to send the to-be-sent data packets, where the extension headers of the to-be-sent data packets carry the BID.

It should be noted that, when a third link is further included in addition to the first link and the second link between the server and the client, after step 310 in which the server sends the binding identity BID to the client by using the first link, and sends the BID to the client by using the second link, the multi-link convergence method provided by the embodiment of the present invention may further include the following steps.

A1. The server receives a third binding request sent by the client by using a third link, where the third binding request carries the BID, and the third link is a link other than the first link and the second link in the at least two links.

A2. The server sends a third LSID to the client by using the third link.

A3. The server receives a third authentication request sent by the client by using the third link, where the third authentication request includes the third LSID.

A3. The server performs authentication on the third link according to the third authentication request.

A4. If the third link is authenticated successfully, the server sends a binding acknowledgement message to the client by using the third link, so that the client determines that the first link, the second link, and the third link can be jointly used to send to-be-sent data packets, where extension headers of the to-be-sent data packets carry the BID.

That is, when another link in addition to the first link and the second link is further included between the server and the client, the another link may be processed according to a manner of processing the second link as described in the foregoing step 106 to step 110. For example, steps A1 to A4 performed for the third link are similar to steps 106 to 110 in the foregoing embodiment, and are not further described herein.

In some embodiments of the present invention, after step 305 in which the server sends the binding identity BID to the client by using the first link, and sends the BID to the client by using the second link, the multi-link convergence method provided by the embodiment of the present invention may further include the following steps.

B1. The server receives an IP address request sent by the client by using the first link or the second link.

B2. The server allocates an IP address to the client, and sends the IP address to the client.

That is, when the server sends the BID to the client by using the first link, the client may obtain an IP address of the server, but the client cannot know the IP address of the client yet. The client may send the IP address request by using the first link or the second link. The server may allocate the IP address to the client, and the server may send the IP address to the client by using the first link or the second link. For an implementation process in which the server allocates the IP address to the client, refer to the description in the prior art. Details are not further described herein.

Further, in some embodiments of the present invention, after step B1 in which the server allocates the IP address to the client, and sends the IP address to the client, the multi-link convergence method provided by the embodiment of the present invention may further include the following steps.

C1. The server receives, by using the first link, a first data packet sent by the client, and the server receives, by using the second link, a second data packet sent by the client, where an extension header of the first data packet carries the BID and a first packet sequence number, an extension header of the second data packet carries the BID and a second packet sequence number, and source IP addresses in the first data packet and the second data packet are the IP address of the client.

C2. The server determines, according to the same BID carried in the first data packet and the second data packet, that the first data packet and the second data packet are data packets received by using both the first link and the second link.

C3. The server sorts the first data packet and the second data packet according to a time sequence relationship between the first packet sequence number and the second packet sequence number, and recombines the sorted first data packet and second data packet to obtain a data packet combination.

C4. The server sends the data packet combination to a destination device.

That is, in the embodiment of the present invention, after the client obtains the IP address from the server, the client may jointly transmit multiple data packets on the client side on the first link and the second link. It may be understood that, joint transmission indicates that the client jointly uses the first link and the second link to transmit multiple data packets. An implementation manner that may exist include: the client transmits a part of data packets by using the first link, and the client transmits another part of data packets by using the second link. For the detailed description of step C1 to step C4, refer to the description of the foregoing embodiment.

As can be known from the description of the present invention in the foregoing embodiment, at least two links are established between a client and a server; the server receives a first binding request sent by the client by using a first link, and receives a second binding request sent by the client by using a second link, where the first binding request carries a first temporary ID, and the second binding request carries a second temporary ID from the client; the server sends a first LSID to the client by using the first link, and sends a second LSID to the client by using the second link; the server receives a first authentication request sent by the client by using the first link, and receives a second authentication request sent by the client by using the second link, where the first authentication request includes the first LSID and first authentication information, and the second authentication request includes the second LSID and second authentication information; the server performs authentication on the first link according to the first authentication request, and performs authentication on the second link according to the second authentication request; and if both the first link and the second link are authenticated successfully, and the server determines that the first temporary ID and the second temporary ID are the same temporary ID, the server sends a BID to the client by using the first link, and sends the BID to the client by using the second link, so that the client can use both the first link and the second link to send to-be-sent data packets, where extension headers of the to-be-sent data packets carry the BID. Because the same BID is allocated to the first link and the second link that are established between the client and the server, by adding the BID to extension headers of the to-be-sent data packets, the client can jointly use multiple links to transmit the data packets. In this way, multi-link convergence can be implemented, and available bandwidth is increased.

Figure 4:
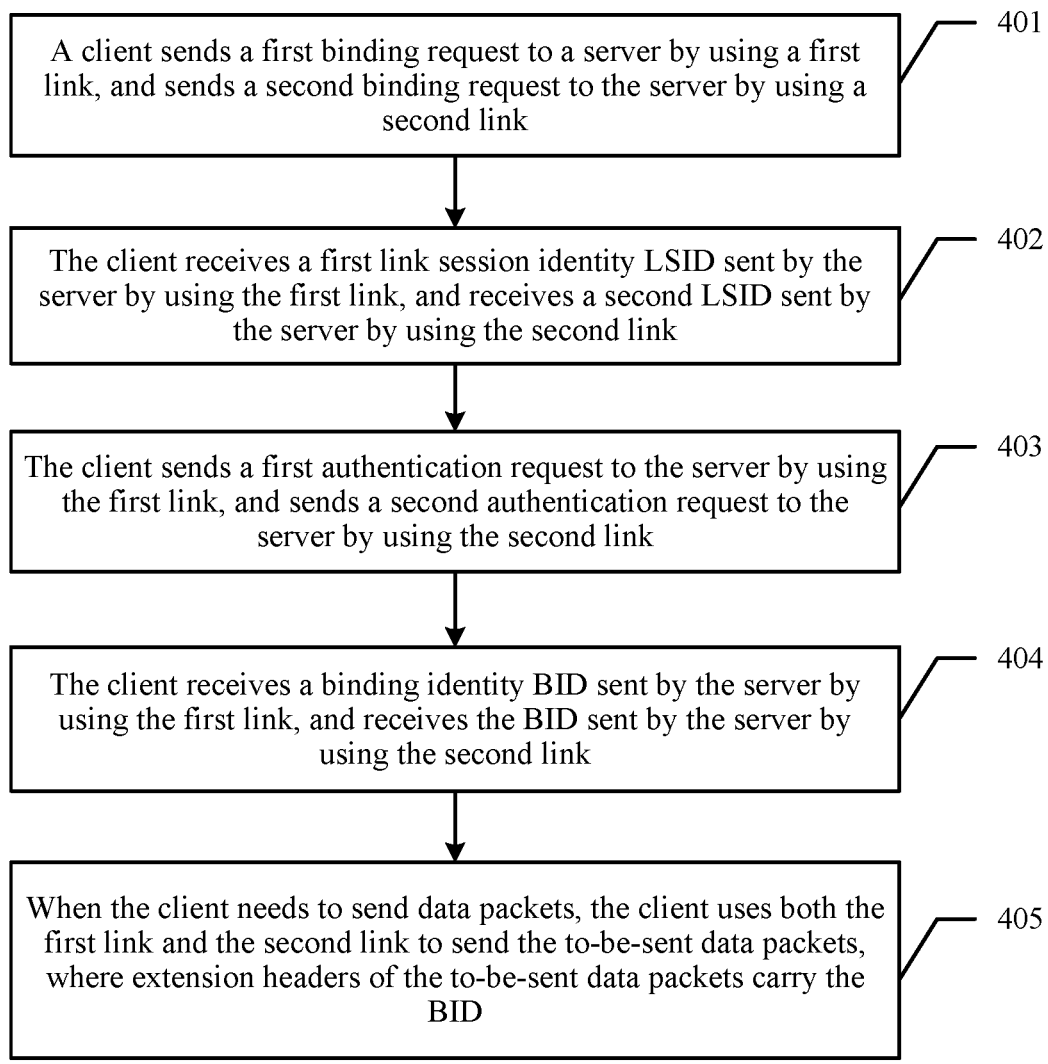
FIG. 4 is a schematic block flow diagram of another multi-link convergence method according to an embodiment of the present invention.

In the foregoing embodiment, a multi-link convergence method provided by the embodiment of the present invention is described from a perspective of a server side. Referring to FIG. 4, next, a multi-link convergence method provided by an embodiment of the present invention is described from a perspective of a client side, and may specifically include the following steps.

404. A client sends a first binding request to a server by using a first link, and sends a second binding request to the server by using a second link.

At least two links are established between the client and the server, the first link is one link in the at least two links, the second link is a link other than the first link in the at least two links, the first binding request carries a first temporary identity ID, and the second binding request carries a second temporary ID.

In the embodiment of the present invention, for highly efficient transmission of data packets between the server and the client, at least two links may be established between the server and the client. If the links may be jointly used to transmit data packets, efficiency of transmitting data packets between the server and the client is improved greatly. To jointly use the links, it is necessary to converge multiple links. In the embodiment of the present invention, joint use of the first link and the second link in the at least two links established between the server and the client is described in detail. For joint use of other links between the client and the server, refer to the process of jointly using the first link and the second link. First the client sends the first binding request to the server by using the first link, and sends the second binding request by using the second link.

In some embodiments of the present invention, before step 401 in which the client sends the first binding request to the server by using the first link, and sends the second binding request to the server by using the second link, the multi-link convergence method provided by the embodiment of the present invention may further include the following step:

The client generates a first temporary ID for the first link according to a unique identity of the client, and generates a second temporary ID for the second link according to the unique identity of the client.

That is, the client may further allocate a temporary ID to the first link and the second link respectively. Specifically, the client may generate the temporary ID according to the unique identity of the client. Using an example for description, the unique identity of the client may be a Media Access Control (Media Access Control, MAC) address of the client, or an international mobile equipment identity (International Mobile Equipment Identity, IMEI) of the client. For another example, the unique identity of the client may also be an identity allocated by the server to the client. When the client needs to jointly use links, binding requests sent by the client by using the links all carry a same temporary ID. Therefore, the server may learn, according to the same temporary ID carried in the multiple links, that the client initiates the binding requests for using both the multiple links to the server.

402. The client receives a first link session identity LSID sent by the server by using the first link, and receives a second LSID sent by the server by using the second link.

In the embodiment of the present invention, the server receives, by using the first link, the first binding request sent by the client, and receives the second binding request by using the second link. The LSID allocated by the server to the first link is the first LSID, and the LSID allocated to the second link is the second LSID. Then the server sends the first LSID to the client by using the first link, and sends the second LSID to the client by using the second link. The client receives, by using the first link, the first LSID returned by the server, and receives, by using the second link, the second LSID returned by the server. It may be understood that, if the server receives a binding request sent by the client by using another link, the server also needs to allocate an LSID to the another link between the client and the server, and an LSID allocated by the server to each link is different.

403. The client sends a first authentication request to the server by using the first link, and sends a second authentication request to the server by using the second link.

The first authentication request includes the first LSID and first authentication information, and the second authentication request includes the second LSID and second authentication information.

In the embodiment of the present invention, after the client receives, from the server by using the first link, the first LSID allocated by the server to the first link, and receives the second LSID by using the second link, the client generates the first authentication request for the first link. The client adds the first LSID and the first authentication information to the first authentication request. The client generates the second authentication request for the second link. The client adds the second LSID and the second authentication information to the second authentication request. The first authentication information is user information that needs to be used when the client requests the server to perform authentication on the first link, and the second authentication information is user information that needs to be used when the client requests the server to perform authentication on the second link.

404. The client receives a binding identity BID sent by the server by using the first link, and receives the BID sent by the server by using the second link.

In the embodiment of the present invention, the client requests the server to perform authentication on the first link and requests the server to perform authentication on the second link. The server parses the first authentication request sent by the client to obtain the first LSID and the first authentication information. The base station may perform authentication on the first link by using the first LSID and the first authentication information. The server parses the second authentication request sent by the client to obtain the second LSID and the second authentication information. The base station may perform authentication on the second link by using the second LSID and the second authentication information. Each step subsequently described in the embodiment of the present invention can continue to be performed only when the server authenticates the first link successfully and authenticates the second link successfully. In this way, the client can receive the BID by using the first link and receive the BID by using the second link.

405. When the client needs to send data packets, the client jointly uses the first link and the second link to send the to-be-sent data packets, where extension headers of the to-be-sent data packets carry the BID.

In the embodiment of the present invention, the server acknowledges that an extension header in a data packet sent on the second link by the client may carry the BID allocated by the server to the first link. Because an extension header in a data packet sent on the first link by the client carries the BID, the client may send multiple data packets to the server by using the first link and the second link. The server may confirm, according to the same BID carried in each data packet, that the received data packets are data packets that are sent by the same client by using both the first link and the second link.

In some embodiments of the present invention, when a third link is further included in addition to the first link and the second link between the server and the client, after step 404 in which the client receives the binding identity BID sent by the server by using the first link, and receives the BID sent by the server by using the second link, the multi-link convergence method provided by the embodiment of the present invention may further include the following steps.

D1. The client sends a third binding request to the server by using a third link, where the third binding request carries the BID, and the third link is a link other than the first link and the second link in the at least two links.

D2. The client receives a third LSID sent by the server by using the third link.

D3. The client sends a third authentication request to the server by using the third link, where the third authentication request includes the third LSID.

D4. The client receives a binding acknowledgement message sent by the server by using the third link, so that the client can use all the first link, the second link, and the third link to send to-be-sent data packets, where extension headers of the to-be-sent data packets carry the BID.

That is, when another link in addition to the first link and the second link is further included between the server and the client, the another link may be processed according to a manner of processing the second link as described in the foregoing step 205 to step 208. For example, steps D1 to D4 performed for the third link are similar to steps 205 to 208 in the foregoing embodiment, and are not further described herein.

In some embodiments of the present invention, after step 404 in which the client receives the binding identity BID sent by the server by using the first link, and receives the BID sent by the server by using the second link, the multi-link convergence method provided by the embodiment of the present invention may further include the following steps.

E1. The client sends an IP address request to the server by using the first link or the second link.

E2. The client receives an IP address allocated by the server to the client.

That is, when the server sends the BID to the client by using the first link, the client may obtain an IP address of the server, but the client cannot know the IP address of the client yet. The client may send the IP address request by using the first link or the second link. The server may allocate the IP address to the client, and the server may send the IP address to the client by using the first link or the second link. For an implementation process in which the server allocates the IP address to the client, refer to the description in the prior art. Details are not further described herein.

Further, in some embodiments of the present invention, step 405 in which the client jointly uses the first link and the second link to send the to-be-sent data packets may specifically include the following steps.

F1. The client allocates, according to a time sequence relationship between a first data packet and a second data packet, a first packet sequence number to the first data packet and a second packet sequence number to the second data packet respectively.

F2. The client sends the first data packet to the server by using the first link, and sends the second data packet to the server by using the second link, where an extension header of the first data packet carries the BID and the first packet sequence number, an extension header of the second data packet carries the BID and the second packet sequence number, and source IP addresses in the first data packet and the second data packet are the IP address of the client.

In step F1, the client allocates, according to the time sequence relationship between the first data packet and the second data packet, the first packet sequence number to the first data packet and the second packet sequence number to the second data packet respectively. Then in step F2, the client sends the first data packet by using the first link, and sends the second data packet by using the second link, where the client adds the BID and the first packet sequence number to the first data packet, and adds the BID and the second packet sequence number to the second data packet. The server determines, according to the same BID carried in the first data packet and the second data packet, that the first data packet and the second data packet are data packets that are received by using both the first link and the second link. Because different channel conditions may exist in the first link and the second link, a time sequence of arrival of the first data packet and the second data packet at the server may be different from an original time sequence of the first data packet and the second data packet on the client. Therefore, in the embodiment of the present invention, the client allocates, according to the original time sequence of the first data packet and the second data packet on the client, a packet sequence number to the first data packet and the second data packet respectively, where the client allocates the first packet sequence number to the first data packet and allocates the second packet sequence number to the second data packet. The server may resort the first data packet and the second data packet according to the time sequence relationship between the packet sequence numbers.

In some embodiments of the present invention, after step 405 in which when the client needs to send data packets, the client jointly uses the first link and the second link to send the to-be-sent data packets, the multi-link convergence method provided by the embodiment of the present invention may further include the following step:

The client periodically maintains a link status of each link established between the client and the server.

That the client needs to maintain each link between the client and the server periodically includes maintaining link statuses of the first link and the second link to ensure smoothness of the links. Specifically, the client may send heartbeat packets periodically by using the first link and the second link between the client and the server, to detect whether the links are smooth. The heartbeat packet is a command word that is defined by the client or the server and notifies a status of the client or the server to the peer periodically, and is sent between the client and the server at a certain time interval. For example, the client may send a heartbeat packet to the server at an interval of one second. If the client finds, by periodically maintaining the link status, that a link breaks, a link connection needs to be reestablished. Specifically, the foregoing method in the embodiment of the present invention may be performed again to complete re-establishment of the link.

As can be known from the description of the present invention in the foregoing embodiment, at least two links are established between a client and a server; the client sends a first binding request to the server by using a first link, and sends a second binding request to the server by using a second link, where the client adds a first temporary ID to the first binding request, and adds a second temporary ID to the second binding request; the client receives a first LSID by using the first link, and receives a second LSID by using the second link; then the client sends a first authentication request by using the first link, and sends a second authentication request by using the second link, where the first authentication request includes the first LSID and first authentication information, and the second authentication request includes the second LSID and second authentication information; if the server authenticates the first link and the second link successfully, and the server determines that the first temporary ID and the second temporary ID are the same temporary ID, the client may receive a BID by using the first link, and receive the BID by using the second link; therefore, the client can use both the first link and the second link to send to-be-sent data packets, where extension headers of the to-be-sent data packets carry the BID. Because the same BID is allocated to the first link and the second link that are established between the client and the server, by adding the BID to extension headers of the to-be-sent data packets, the client can jointly use multiple links to transmit the data packets. In this way, multi-link convergence can be implemented, and available bandwidth is increased.

For better understanding and implementing the foregoing solutions of the embodiments of the present invention, the following uses a corresponding application scenario as an example for detailed description.

To perform multi-link service network convergence briefly, high-efficiently, and quickly on an existing network in the embodiment of the present invention, a layer-2 structure of the existing network needs to be used to bind links. The multi-link convergence method provided by the embodiment of the present invention is applied to a layer-2 network. A server directly adds binding parameters to complete extensions to protocols, including extensions to VLAN, the PPP protocol, and other layer-2 protocols. Referring to FIG. 5-*a*, FIG. 5-*a* is a schematic diagram of an application scenario of a multi-link convergence method in an embodiment of the present invention. The client in the embodiment of the present invention is specifically a gateway (Home gateway, HG) in an application scenario. Two links are established between the gateway and a server, and are respectively a wired access network that uses a digital subscriber line access multiplexer (Digital Subscriber Line Access Multiplexer, DSLAM) and a wireless network that uses a base station (evolved Node B, eNB). On an uplink from the gateway to the server, the gateway receives data from a user end, and sends the data to the server by using the wired network and the wireless network, and then the server sends the data to the Internet. In the embodiment of the present invention, the gateway and the server make an extension to a header of a data packet in a data link layer. As shown in FIG. 5-*b*, FIG. 5-*b* is a schematic diagram of an implementation manner in which the header of the data packet in the data link layer is extended according to the embodiment of the present invention. A protocol data unit (Protocol Data Unit, PDU) header (Head) is encapsulated in a header of the data packet in a physical layer. In addition to an encapsulated original L2 Head, an E-Head needs to be encapsulated in the data packet in the data link layer, and is used to store a binding identity and a packet sequence number. An IP payload (payload) is encapsulated in the data packet in a network layer.

Next, in the present invention, extensions to PPP-related protocols are described by using an example. On a basis of reliable PPP, a brief and high-efficient link binding is established to implement convergence of multi-link bandwidth. In this scenario, the client is specifically a gateway. The server may be specifically a PPP server. For example, two links are established between the gateway and the server, and are respectively an uplink 1 and an uplink 2.

As shown in FIG. 5-*c*, FIG. 5-*c* is a schematic diagram of an interaction process between the client and the server in the application scenario of the multi-link convergence method according to the embodiment of the present invention. A process of PPP protocol extension processing provided by the embodiment of the present invention may include the following several phases:

1. PPPoE Discovery Phase of the Two Links

The phase may include two phases: 1.1. The gateway sends a PPPoE request by using the uplink 1. 1.2. The gateway sends a PPPoE request by using the uplink 2.

The gateway initiates a PPPoE request by using the two links respectively. In step 1.1, the gateway has not obtained a BID yet, and the PPPoE request may be filled with 0. In step 1.2, the gateway has obtained the BID, and therefore adds the BID to the PPPoE request. The server allocates, by performing the PPPoE discovery phase, an LSID1 to the uplink 1 and an LSID2 to the uplink 2 respectively.

2. Link Authentication Phase

The phase may include two phases: 2.1. The gateway initiates PPP authentication by using the uplink 1. 2.2. The gateway initiates PPP authentication by using the uplink 2.

The server obtains, by using the uplink 1 and the uplink 2, that link session IDs of the two links are the LSID1 and the LSID2 respectively. The gateway uses IPCP to negotiate an authentication mode with the server by using the two links respectively, and performs authentication on a user name and a password. Specifically, the server may use PAP/CHAP to perform authentication respectively. If both the uplink 1 and the uplink 2 are authenticated successfully, the server may send the BID to the gateway.

In the embodiment of the present invention, a Head (E-Head for short hereinafter) header is extended after a PPP header. The E-head includes the BID and a packet sequence number. Referring to FIG. 5-*b*, an L2 Head may be specifically a PPPHead. When the server acknowledges that the two links may be jointly used, the server binds the LSID1 with the LSID2. The gateway may add the BID to data packets sent on the uplink 1 and the uplink 2.

3. IP Address Acquisition Phase

In this phase, the gateway uses PPP IPCP to obtain an IP address of the gateway by using the uplink 1.

After the link is authenticated successfully, the gateway obtains a wide area network (WAN, Wide Area Network) interface address of the HG by using IPCP, where the interface address is used to perform point-to-point communication with the server.

4. Link Maintenance Phase

The phase may include two phases: 4.1. The gateway maintains a link status by using the uplink 1 and the Link Control Protocol (Link Control Protocol, LCP) phase. 4.2. The gateway maintains a link status by using the uplink 2 and the LCP phase.

The gateway and the server may respectively use LCP to perform link maintenance by using the two links. If it is found that a link breaks, PPPoE negotiation is re-initiated to reestablish the link.

After completion of multi-link convergence, an extended PPPoE link is established in multiple links, and PPP data transmission may be performed. Therefore, a PPP header is encapsulated in an extension header of a data packet, and the data packet may be transmitted by using the established PPPoE link for transmission. The client may make an extension to add a packet sequence number, so that a data packet on each uplink is identified. The server may resort multiple data packets according to packet sequence numbers, and send the resorted data packets to the Internet.

As can be known from the foregoing description of the example in the embodiment of the present invention, in the embodiment of the present invention, multiple different networks may be jointly used to perform multi-link convergence and increase user bandwidth. Furthermore, extensions are made to an existing network infrastructure and architecture, and a distributed software architecture is used. A network operator does not need to add a device at a central office end, which not only increases revenues but also reduces costs. In addition, in the embodiment of the present invention, service provisioning still adopts an existing provisioning mode, and may be completely compatible with the existing mode, and smooth handover may be performed, which reduces network complexity for the network operator.

It should be noted that, for ease of description in the foregoing method embodiments, the method is described as a series of actions. A person skilled in the art should understand that the actions in the present invention are not limited by the sequence described herein because some steps may occur in other sequence or occur simultaneously according to the present invention. In addition, a person skilled in the art should also understand that all the embodiments described in this specification are exemplary embodiments, and the involved actions and modules are not necessarily mandatory to the present invention.

For better implementing the foregoing solutions of the embodiments of the present invention, the following further provides related apparatuses for implementing the foregoing solutions.

Referring to FIG. 6-*a*, a server 600 provided by an embodiment of the present invention may include a first receiving module 601, a first sending module 602, a first authentication module 603, a second receiving module 604, a second sending module 605, and a second authentication module 606, where the first receiving module 601 is configured to receive a first binding request sent by a client by using a first link, where at least two links are established between the client and the server, and the first link is one link in the at least two links;

the first sending module 602 is configured to send a first link session identity LSID to the client by using the first link;

the first receiving module 601 is further configured to receive a first authentication request sent by the client by using the first link, where the first authentication request includes the first LSID and first authentication information;

the first authentication module 603 is configured to perform authentication on the first link according to the first authentication request;

the first sending module 602 is further configured to send, when the first authentication module authenticates the first link successfully, a binding identity BID to the client by using the first link;

the second receiving module 604 is configured to receive a second binding request sent by the client by using a second link, where the second binding request carries the BID, and the second link is a link other than the first link in the at least two links;

the second sending module 605 is configured to send a second LSID to the client by using the second link;

the second receiving module 604 is further configured to receive a second authentication request sent by the client by using the second link, where the second authentication request includes the second LSID and second authentication information;

the second authentication module 606 is configured to perform authentication on the second link according to the second authentication request; and the second sending module 605 is further configured for the server to send, when the second authentication module authenticates the second link successfully, a binding acknowledgement message to the client by using the second link, so that the client can use both the first link and the second link to send to-be-sent data packets, where extension headers of the to-be-sent data packets carry the BID.

In some embodiments of the present invention, referring to FIG. 6-*b*, compared with the server shown in FIG. 6-*a*, the server 600 further includes:

an IP management module 607, configured to: after the second sending module 605 sends the binding acknowledgement message to the client by using the second link, receive an IP address request sent by the client by using the first link or the second link; and allocate an IP address to the client, and send the IP address to the client.

In some embodiments of the present invention, referring to FIG. 6-*c*, compared with the server shown in FIG. 6-*b*, the server 600 further includes a packet receiving module 608, a BID determining module 609, an sorting and combining module 610, and a packet sending module 611, where the packet receiving module 608 is configured to: after the IP management module allocates the IP address to the client, and sends the IP address to the client, receive, by using the first link, a first data packet sent by the client, and receive, by the server by using the second link, a second data packet sent by the client, where an extension header of the first data packet carries the BID and a first packet sequence number, an extension header of the second data packet carries the BID and a second packet sequence number, and source IP addresses in the first data packet and the second data packet are the IP address of the client;

the BID determining module 609 is configured to determine, according to the same BID carried in the first data packet and the second data packet, that the first data packet and the second data packet are data packets received by using both the first link and the second link;

the sorting and combining module 610 is configured to sort the first data packet and the second data packet according to a time sequence relationship between the first packet sequence number and the second packet sequence number, and recombine the sorted first data packet and second data packet to obtain a data packet combination; and the packet sending module 611 is configured to send the data packet combination to a destination device.

In some embodiments of the present invention, referring to FIG. 6-*d*, compared with the server shown in FIG. 6-*a*, the server 600 further includes a third receiving module 612, a third sending module 613, and a third authentication module 614, where the third receiving module 612 is configured to receive, after the second sending module sends the binding acknowledgement message to the client by using the second link, a third binding request sent by the client by using a third link, where the third binding request carries the BID, and the third link is a link other than the first link and the second link in the at least two links;

the third sending module 613 is configured to send a third LSID to the client by using the third link;

the third receiving module 612 is further configured to receive a third authentication request sent by the client by using the third link, where the third authentication request includes the third LSID;

the third authentication module 614 is configured to perform authentication on the third link according to the third authentication request; and the third sending module 613 is further configured to send, when the third authentication module authenticates the third link successfully, a binding acknowledgement message to the client by using the third link, so that the client can use all the first link, the second link, and the third link to send to-be-sent data packets, where extension headers of the to-be-sent data packets carry the BID.

As can be known from the description of the present invention in the foregoing embodiment, at least two links are established between a client and a server; the server first receives a first binding request sent by the client by using a first link; then the server sends a first LSID to the client by using the first link; then the server receives a first authentication request sent by the client by using the first link, and performs authentication on the first link according to the received first authentication request; when the server authenticates the first link successfully, the server sends a BID to the client by using the first link; then the server receives a second binding request sent by the client by using a second link; the server sends a second LSID to the client by using the second link; then the server receives a second authentication request sent by the client by using the second link, and performs authentication on the second link according to the received second authentication request; when the server authenticates the second link successfully, the server sends a binding acknowledgement message to the client by using the second link; the client receives the binding acknowledgement message; and according to the binding acknowledgement message, the client jointly uses the first link and the second link to send to-be-sent data packets. Because the same BID is allocated to the first link and the second link that are established between the client and the server, by adding the BID to extension headers of the to-be-sent data packets, the client can jointly use multiple links to transmit the data packets. In this way, multi-link convergence can be implemented, and available bandwidth is increased.

Referring to FIG. 7-*a*, a client 700 provided by an embodiment of the present invention may include a first sending module 701, a first receiving module 702, a second sending module 703, a second receiving module 704, and a link joint-using module 705, where the first sending module 701 is configured to send a first binding request to a server by using a first link, where at least two links are established between the client and the server, and the first link is one link in the at least two links;

the first receiving module 702 is configured to receive a first link session identity LSID sent by the server by using the first link;

the first sending module 701 is configured to send a first authentication request to the server by using the first link, where the first authentication request includes the first LSID and first authentication information;

the first receiving module 702 is configured to receive a binding identity BID sent by the server by using the first link;

the second sending module 703 is configured to send a second binding request to the server by using a second link, where the second binding request carries the BID, and the second link is a link other than the first link in the at least two links;

the second receiving module 704 is configured to receive a second LSID sent by the server by using the second link;

the second sending module 703 is further configured to send a second authentication request to the server by using the second link, where the second authentication request includes the second LSID and second authentication information;

the second receiving module 704 is further configured to receive a binding acknowledgement message sent by the server by using the second link; and the link joint-using module 705 is configured to jointly use, when the client needs to send data packets, the first link and the second link to send the to-be-sent data packets, where extension headers of the to-be-sent data packets carry the BID.

In some embodiments of the present invention, referring to FIG. 7-*b*, compared with the client shown in FIG. 7-*a*, the client 700 further includes:

an IP obtaining module 706, configured to: after the second receiving module receives the binding acknowledgement message sent by the server by using the second link, send an IP address request to the server by using the first link or the second link; and receive an IP address allocated by the server to the client.

In some embodiments of the present invention, referring to FIG. 7-*c*, the link joint-using module 705 includes a packet sequence number allocation submodule 7051 and a packet sending submodule 7052, where the packet sequence number allocation submodule 7051 is configured to allocate, according to a time sequence relationship between a first data packet and a second data packet, a first packet sequence number to the first data packet and a second packet sequence number to the second data packet respectively; and the packet sending submodule 7052 is configured to send the first data packet to the server by using the first link, and send the second data packet to the server by using the second link, where an extension header of the first data packet carries the BID and the first packet sequence number, an extension header of the second data packet carries the BID and the second packet sequence number, and source IP addresses in the first data packet and the second data packet are the IP address of the client.

In some embodiments of the present invention, the BID is encapsulated in a data link layer of the to-be-sent data packet by the client.

In some embodiments of the present invention, referring to FIG. 7-d, compared with the client shown in FIG. 7-a, the client 700 further includes a third sending module 707 and a third receiving module 708, where the third sending module 707 is configured to send, after the second receiving module receives the binding acknowledgement message sent by the server by using the second link, a third binding request to the server by using a third link, where the third binding request carries the BID, and the third link is a link other than the first link and the second link in the at least two links;

the third receiving module 708 is configured to receive a third LSID sent by the server by using the third link;

the third sending module 707 is further configured to send a third authentication request to the server by using the third link, where the third authentication request includes the third LSID; and the third receiving module 708 is further configured to receive a binding acknowledgement message sent by the server by using the third link, so that the client can use all the first link, the second link, and the third link to send to-be-sent data packets, where extension headers of the to-be-sent data packets carry the BID.

As can be known from the description of the present invention in the foregoing embodiment, at least two links are established between a client and a server; the client first sends a first binding request to the server by using a first link; then the client sends a first authentication request to the server by using the first link; when the server authenticates the first link successfully, the client may receive, by using the first link, a BID allocated by the server to the first link; then the client sends a second binding request to the server by using a second link; the client receives a second LSID; then the client sends a second authentication request to the server by using the second link; when the server authenticates the second link successfully, the client receives a binding acknowledgement message; and according to the binding acknowledgement message, the client jointly uses the first link and the second link to send to-be-sent data packets. Because the same BID is allocated to the first link and the second link that are established between the client and the server, by adding the BID to extension headers of the to-be-sent data packets, the client can jointly use multiple links to transmit the data packets. In this way, multi-link convergence can be implemented, and available bandwidth is increased.

Referring to FIG. 8-a, a server 800 provided by an embodiment of the present invention may include a receiving module 801, a sending module 802, and an authentication module 803, where the receiving module 801 is configured to receive a first binding request sent by a client by using a first link, and receive a second binding request sent by the client by using a second link, where at least two links are established between the client and the server, the first link is one link in the at least two links, the second link is a link other than the first link in the at least two links, the first binding request carries a first temporary identity ID, and the second binding request carries a second temporary ID;

the sending module 802 is configured to send a first link session identity LSID to the client by using the first link, and send a second LSID to the client by using the second link;

the receiving module 801 is further configured to receive a first authentication request sent by the client by using the first link, and receive a second authentication request sent by the client by using the second link, where the first authentication request includes the first LSID and first authentication information, and the second authentication request includes the second LSID and second authentication information;

the authentication module 803 is configured to perform authentication on the first link according to the first authentication request, and perform authentication on the second link according to the second authentication request; and the sending module 802 is further configured to: when the authentication module authenticates both the first link and the second link successfully, and the server determines that the first temporary ID and the second temporary ID are the same temporary ID, send a binding identity BID to the client by using the first link, and send the BID to the client by using the second link, so that the client can use both the first link and the second link to send to-be-sent data packets, where extension headers of the to-be-sent data packets carry the BID.

In some embodiments of the present invention, referring to FIG. 8-b, compared with the server shown in FIG. 8-a, the server 800 further includes:

an IP management module 804, configured to: after the sending module sends the binding identity BID to the client by using the first link, and sends the BID to the client by using the second link, receive an IP address request sent by the client by using the first link or the second link; and allocate an IP address to the client, and send the IP address to the client.

In some embodiments of the present invention, referring to FIG. 8-c, compared with the server shown in FIG. 8-a, the server 800 further includes a packet receiving module 805, a BID determining module 806, an sorting and combining module 807, and a packet sending module 808, where the packet receiving module 805 is configured to receive, by using the first link, a first data packet sent by the client, and receive, by the server by using the second link, a second data packet sent by the client, where an extension header of the first data packet carries the BID and a first packet sequence number, an extension header of the second data packet carries the BID and a second packet sequence number, and source IP addresses in the first data packet and the second data packet are the IP address of the client;

the BID determining module 806 is configured to determine, according to the same BID carried in the first data packet and the second data packet, that the first data packet and the second data packet are data packets received by using both the first link and the second link;

the sorting and combining module 807 is configured to sort the first data packet and the second data packet according to a time sequence relationship between the first packet sequence number and the second packet sequence number, and recombine the sorted first data packet and second data packet to obtain a data packet combination; and the packet sending module 808 is configured to send the data packet combination to a destination device.

In some embodiments of the present invention, the receiving module 801 is further configured to receive, after the sending module sends the binding identity BID to the client by using the first link, and sends the BID to the client by using the second link, a third binding request sent by the client by using a third link, where the third binding request carries the BID, and the third link is a link other than the first link and the second link in the at least two links;

the sending module 802 is further configured to send a third LSID to the client by using the third link;

the authentication module 803 is further configured to receive a third authentication request sent by the client by using the third link, where the third authentication request includes the third LSID; and the sending module 802 is further configured to send, when the authentication module authenticates the third link successfully, a binding acknowledgement message to the client by using the third link, so that the client can use all the first link, the second link, and the third link to send to-be-sent data packets, where extension headers of the to-be-sent data packets carry the BID.

As can be known from the description of the present invention in the foregoing embodiment, at least two links are established between a client and a server; the server receives a first binding request sent by the client by using a first link, and receives a second binding request sent by the client by using a second link, where the first binding request carries a first temporary ID, and the second binding request carries a second temporary ID from the client; the server sends a first LSID to the client by using the first link, and sends a second LSID to the client by using the second link; the server receives a first authentication request sent by the client by using the first link, and receives a second authentication request sent by the client by using the second link, where the first authentication request includes the first LSID and first authentication information, and the second authentication request includes the second LSID and second authentication information; the server performs authentication on the first link according to the first authentication request, and performs authentication on the second link according to the second authentication request; and if both the first link and the second link are authenticated successfully, and the server determines that the first temporary ID and the second temporary ID are the same temporary ID, the server sends a BID to the client by using the first link, and sends the BID to the client by using the second link, so that the client can use both the first link and the second link to send to-be-sent data packets, where extension headers of the to-be-sent data packets carry the BID. Because the same BID is allocated to the first link and the second link that are established between the client and the server, by adding the BID to extension headers of the to-be-sent data packets, the client can jointly use multiple links to transmit the data packets. In this way, multi-link convergence can be implemented, and available bandwidth is increased.

Referring to FIG. 9-*a*, a client 900 provided by an embodiment of the present invention may include a sending module 901, a receiving module 902, and a link joint-using module 903, where the sending module 901 is configured to send a first binding request to a server by using a first link, and send a second binding request to the server by using a second link, where at least two links are established between the client and the server, the first link is one link in the at least two links, the second link is a link other than the first link in the at least two links, the first binding request carries a first temporary identity ID, and the second binding request carries a second temporary ID;

the receiving module 902 is configured to receive a first link session identity LSID sent by the server by using the first link, and receive a second LSID sent by the server by using the second link;

the sending module 901 is further configured to send a first authentication request to the server by using the first link, and send a second authentication request to the server by using the second link, where the first authentication request includes the first LSID and first authentication information, and the second authentication request includes the second LSID and second authentication information;

the receiving module 902 is further configured to receive a binding identity BID sent by the server by using the first link, and receive the BID sent by the server by using the second link; and the link joint-using module 903 is configured to jointly use, when the client needs to send data packets, the first link and the second link to send the to-be-sent data packets, where extension headers of the to-be-sent data packets carry the BID.

In some embodiments of the present invention, referring to FIG. 9-*b*, compared with the client shown in FIG. 9-*a*, the client 900 further includes:

an IP obtaining module 904, configured to: after the receiving module 902 receives the binding identity BID sent by the server by using the first link, and receives the BID sent by the server by using the second link, send an IP address request to the server by using the first link or the second link; and receive an IP address allocated by the server to the client.

In some embodiments of the present invention, referring to FIG. 9-*c*, the link joint-using module 903 includes a packet sequence number allocation submodule 9031 and a packet sending submodule 9032, where the packet sequence number allocation submodule 9031 is configured to allocate, according to a time sequence relationship between a first data packet and a second data packet, a first packet sequence number to the first data packet and a second packet sequence number to the second data packet respectively; and the packet sending submodule 9032 is configured to send the first data packet to the server by using the first link, and send the second data packet to the server by using the second link, where an extension header of the first data packet carries the BID and the first packet sequence number, an extension header of the second data packet carries the BID and the second packet sequence number, and source IP addresses in the first data packet and the second data packet are the IP address of the client.

In some embodiments of the present invention, the BID is encapsulated in a data link layer of the to-be-sent data packet by the client.

In some embodiments of the present invention, the sending module 901 is further configured to send, after the receiving module receives the binding identity BID sent by the server by using the first link, and receives the BID sent by the server by using the second link, a third binding request to the server by using a third link, where the third binding request carries the BID, and the third link is a link other than the first link and the second link in the at least two links;

the receiving module 902 is further configured to receive a third LSID sent by the server by using the third link;

the sending module 901 is further configured to send a third authentication request to the server by using the third link, where the third authentication request includes the third LSID; and the receiving module 902 is further configured to receive a binding acknowledgement message sent by the server by using the third link, so that the client can use all the first link, the second link, and the third link to send to-be-sent data packets, where extension headers of the to-be-sent data packets carry the BID.

In some embodiments of the present invention, referring to FIG. 9-*d*, compared with the client shown in FIG. 9-*a*, the client 900 further includes:

a temporary ID generation module 905, configured to: before the sending module 901 sends the first binding request to the server by using the first link, and sends the second binding request to the server by using the second link, generate a first temporary ID for the first link according to a unique identity of the client, and generate a second temporary ID for the second link according to the unique identity of the client.

As can be known from the description of the present invention in the foregoing embodiment, at least two links are established between a client and a server; the client sends a first binding request to the server by using a first link, and sends a second binding request to the server by using a second link, where the client adds a first temporary ID to the first binding request, and adds a second temporary ID to the second binding request; the client receives a first LSID by using the first link, and receives a second LSID by using the second link; then the client sends a first authentication request by using the first link, and sends a second authentication request by using the second link, where the first authentication request includes the first LSID and first authentication information, and the second authentication request includes the second LSID and second authentication information; if the server authenticates the first link and the second link successfully, and the server determines that the first temporary ID and the second temporary ID are the same temporary ID, the client may receive a BID by using the first link, and receive the BID by using the second link; therefore, the client can use both the first link and the second link to send to-be-sent data packets, where extension headers of the to-be-sent data packets carry the BID. Because the same BID is allocated to the first link and the second link that are established between the client and the server, by adding the BID to extension headers of the to-be-sent data packets, the client can jointly use multiple links to transmit the data packets. In this way, multi-link convergence can be implemented, and available bandwidth is increased.

Referring to FIG. 10, a multi-link convergence system 1000 provided by an embodiment of the present invention may include the server according to any one of FIG. 6-*a*, FIG. 6-*b*, FIG. 6-*c*, or FIG. 6-*d* and the client 700 according to any one of FIG. 7-*a*, FIG. 7-*b*, FIG. 7-*c*, or FIG. 7-*d*, where multiple links are established at a data link layer between the client 700 and the server 600; or the multi-link convergence system 1000 may include the server 800 according to any one of FIG. 8-*a*, FIG. 8-*b*, or FIG. 8-*c*, and the client 900 according to any one of FIG. 9-*a*, FIG. 9-*b*, or FIG. 9-*c*, where multiple links are established at a data link layer between the client 900 and the server 800.

An embodiment of the present invention further provides a computer storage medium. The computer storage medium stores a program. The program includes all or a part of the steps described in the foregoing method embodiments.

Figure 11:
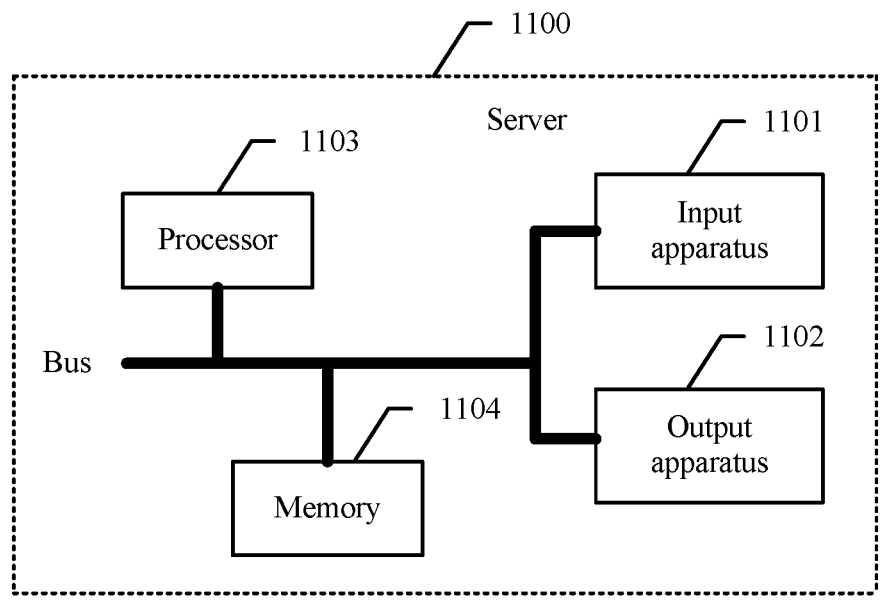
FIG. 11 is a schematic structural diagram of another server according to an embodiment of the present invention.

Next, another server provided by an embodiment of the present invention is described. Referring to FIG. 11, a server 1100 includes:

an input apparatus 1101, an output apparatus 1102, a processor 1103, and a memory 1104 (a quantity of processors 1103 in the server 1100 may be one or more, and one processor is used as an example in FIG. 11). In some embodiments of the present invention, the input apparatus 1101, the output apparatus 1102, the processor 1103, and the memory 1104 may be connected by a bus or in other manners, where the connection by a bus is used as an example in FIG. 11.

The memory 1104 is configured to store a program, data, and an instruction generated in an execution processing manner.

The processor 1103 controls the input apparatus 1101 to receive a first binding request sent by a client by using a first link, where at least two links are established between the client and the server, and the first link is one link in the at least two links;

the processor 1103 controls the output apparatus 1102 to send a first link session identity LSID to the client by using the first link;

the processor 1103 controls the input apparatus 1101 to receive a first authentication request sent by the client by using the first link, where the first authentication request includes the first LSID and first authentication information;

the processor 1103 performs authentication on the first link according to the first authentication request;

if the first link is authenticated successfully, the processor 1103 controls the output apparatus 1102 to send a binding identity BID to the client by using the first link;

the processor 1103 controls the input apparatus 1101 to receive a second binding request sent by the client by using a second link, where the second binding request carries the BID, and the second link is a link other than the first link in the at least two links;

the processor 1103 controls the output apparatus 1102 to send a second LSID to the client by using the second link;

the processor 1103 controls the input apparatus 1101 to receive a second authentication request sent by the client by using the second link, where the second authentication request includes the second LSID and second authentication information;

the processor 1103 performs authentication on the second link according to the second authentication request; and if the second link is authenticated successfully, the processor 1103 controls the output apparatus 1102 to send a binding acknowledgement message to the client by using the second link, so that the client can use both the first link and the second link to send to-be-sent data packets, where extension headers of the to-be-sent data packets carry the BID.

In some embodiments of the present invention, after the binding acknowledgement message is sent to the client by using the second link, the processor 1103 controls the input apparatus 1101 to receive an IP address request sent by the client by using the first link or the second link; and the processor 1103 allocates an IP address to the client, and sends the IP address to the client.

In some embodiments of the present invention, after the IP address is allocated to the client, and the IP address is sent to the client, the processor 1103 controls the input apparatus 1101 to receive, by using the first link, a first data packet sent by the client, and the server to receive, by using the second link, a second data packet sent by the client, where an extension header of the first data packet carries the BID and a first packet sequence number, an extension header of the second data packet carries the BID and a second packet sequence number, and source IP addresses in the first data packet and the second data packet are the IP address of the client;

the processor 1103 determines, according to the same BID carried in the first data packet and the second data packet, that the first data packet and the second data packet are data packets received by using both the first link and the second link;

the processor 1103 sorts the first data packet and the second data packet according to a time sequence relationship between the first packet sequence number and the second packet sequence number, and recombines the sorted first data packet and second data packet to obtain a data packet combination; and the processor 1103 controls the output apparatus 1101 to send the data packet combination to a destination device.

In some embodiments of the present invention, after the binding acknowledgement message is sent to the client by using the second link, the processor 1103 controls the input apparatus 1101 to receive a third binding request sent by the client by using a third link, where the third binding request carries the BID, and the third link is a link other than the first link and the second link in the at least two links;

the processor 1103 sends a third LSID to the client by using the third link;

the processor 1103 controls the input apparatus 1101 to receive a third authentication request sent by the client by using the third link, where the third authentication request includes the third LSID;

the processor 1103 performs authentication on the third link according to the third authentication request; and if the third link is authenticated successfully, the processor 1103 controls the output apparatus 1102 to send a binding acknowledgement message to the client by using the third link, so that the client determines that the first link, the second link, and the third link can be jointly used to send to-be-sent data packets, where extension headers of the to-be-sent data packets carry the BID.

Referring to the server 1100 shown in FIG. 11, the processor 1103, the input apparatus 1101, and the output apparatus 1102 may further use the following method. A program, an instruction, and data of the method are stored in the memory 1104.

The processor 1103 controls the input apparatus 1101 to receive a first binding request sent by a client by using a first link, and receive a second binding request sent by the client by using a second link, where at least two links are established between the client and the server, the first link is one link in the at least two links, the second link is a link other than the first link in the at least two links, the first binding request carries a first temporary identity ID, and the second binding request carries a second temporary ID;

the processor 1103 controls the output apparatus 1102 to send a first link session identity LSID to the client by using the first link, and send a second LSID to the client by using the second link;

the processor 1103 controls the input apparatus 1101 to receive a first authentication request sent by the client by using the first link, and receive a second authentication request sent by the client by using the second link, where the first authentication request includes the first LSID and first authentication information, and the second authentication request includes the second LSID and second authentication information;

the processor 1103 performs authentication on the first link according to the first authentication request, and performs authentication on the second link according to the second authentication request; and if both the first link and the second link are authenticated successfully, and the server determines that the first temporary ID and the second temporary ID are the same temporary ID, the processor 1103 controls the output apparatus 1102 to send a binding identity BID to the client by using the first link, and send the BID to the client by using the second link, so that the client can use both the first link and the second link to send to-be-sent data packets, where extension headers of the to-be-sent data packets carry the BID.

In some embodiments of the present invention, after the binding identity BID is sent to the client by using the first link, and the BID is sent to the client by using the second link, the processor 1103 controls the input apparatus 1101 to receive an IP address request sent by the client by using the first link or the second link; and the processor 1103 allocates an IP address to the client, and sends the IP address to the client.

In some embodiments of the present invention, after the IP address is allocated to the client, and the IP address is sent to the client, the processor 1103 controls the input apparatus 1101 to receive, by using the first link, a first data packet sent by the client, and the server to receive, by using the second link, a second data packet sent by the client, where an extension header of the first data packet carries the BID and a first packet sequence number, an extension header of the second data packet carries the BID and a second packet sequence number, and source IP addresses in the first data packet and the second data packet are the IP address of the client;

the processor 1103 determines, according to the same BID carried in the first data packet and the second data packet, that the first data packet and the second data packet are data packets received by using both the first link and the second link;

the processor 1103 controls the input apparatus 1101 to sort the first data packet and the second data packet according to a time sequence relationship between the first packet sequence number and the second packet sequence number, and recombine the sorted first data packet and second data packet to obtain a data packet combination; and the processor 1103 controls the output apparatus 1102 to send the data packet combination to a destination device.

In some embodiments of the present invention, after the binding identity BID is sent to the client by using the first link, and the BID is sent to the client by using the second link, the processor 1103 controls the input apparatus 1101 to receive a third binding request sent by the client by using a third link, where the third binding request carries the BID, and the third link is a link other than the first link and the second link in the at least two links;

the processor 1103 controls the output apparatus 1102 to send a third LSID to the client by using the third link;

the processor 1103 controls the input apparatus 1101 to receive a third authentication request sent by the client by using the third link, where the third authentication request includes the third LSID;

the processor 1103 performs authentication on the third link according to the third authentication request; and if the third link is authenticated successfully, the processor 1103 controls the output apparatus 1102 to send a binding acknowledgement message to the client by using the third link, so that the client determines that the first link, the second link, and the third link can be jointly used to send to-be-sent data packets, where extension headers of the to-be-sent data packets carry the BID.

Figure 12:
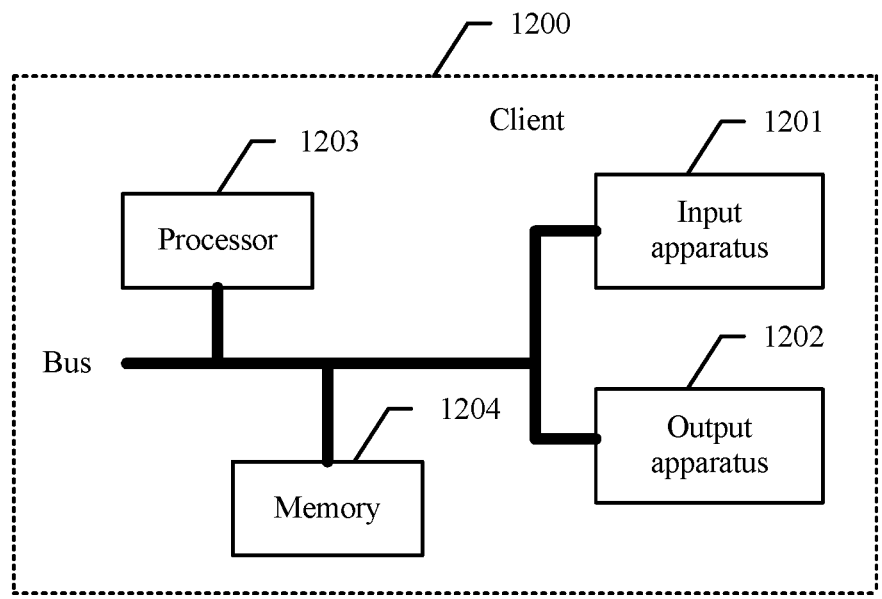
FIG. 12 is a schematic structural diagram of another client according to an embodiment of the present invention.

Next, another client provided by an embodiment of the present invention is described. Referring to FIG. 12, a client 1200 includes:

an input apparatus 1201, an output apparatus 1202, a processor 1203, and a memory 1204 (a quantity of processors 1203 in the client 1200 may be one or more, and one processor is used as an example in FIG. 12). In some embodiments of the present invention, the input apparatus 1201, the output apparatus 1202, the processor 1203, and the memory 1204 may be connected by a bus or in other manners, where the connection by a bus is used as an example in FIG. 12.

The memory 1204 is configured to store a program, data, and an instruction generated in an execution processing manner.

The processor 1203 controls the output apparatus 1202 to send a first binding request to a server by using a first link, where at least two links are established between the client and the server, and the first link is one link in the at least two links;

the processor 1203 controls the input apparatus 1201 to receive a first link session identity LSID sent by the server by using the first link;

the processor 1203 controls the output apparatus 1202 to send a first authentication request to the server by using the first link, where the first authentication request includes the first LSID and first authentication information;

the processor 1203 controls the input apparatus 1201 to receive a binding identity BID sent by the server by using the first link;

the processor 1203 controls the output apparatus 1202 to send a second binding request to the server by using a second link, where the second binding request carries the BID, and the second link is a link other than the first link in the at least two links;

the processor 1203 controls the input apparatus 1201 to receive a second LSID sent by the server by using the second link;

the processor 1203 controls the output apparatus 1202 to send a second authentication request to the server by using the second link, where the second authentication request includes the second LSID and second authentication information;

the processor 1203 controls the input apparatus 1201 to receive a binding acknowledgement message sent by the server by using the second link; and when the client needs to send data packets, the processor 1203 controls the output apparatus 1202 to use both the first link and the second link to send the to-be-sent data packets, where extension headers of the to-be-sent data packets carry the BID.

In some embodiments of the present invention, after the binding acknowledgement message sent by the server by using the second link is received, the processor 1203 controls the output apparatus 1202 to send an IP address request to the server by using the first link or the second link; and the processor 1203 controls the input apparatus 1201 to receive an IP address allocated by the server to the client.

In some embodiments of the present invention, the processor 1203 is specifically configured to perform the following steps:

allocating, according to a time sequence relationship between a first data packet and a second data packet, a first packet sequence number to the first data packet and a second packet sequence number to the second data packet respectively; and sending the first data packet to the server by using the first link, and sending the second data packet to the server by using the second link, where an extension header of the first data packet carries the BID and the first packet sequence number, an extension header of the second data packet carries the BID and the second packet sequence number, and source IP addresses in the first data packet and the second data packet are the IP address of the client.

In some embodiments of the present invention, after the binding acknowledgement message sent by the server by using the second link is received, the processor 1203 controls the output apparatus 1202 to send a third binding request to the server by using a third link, where the third binding request carries the BID, and the third link is a link other than the first link and the second link in the at least two links;

the processor 1203 controls the input apparatus 1201 to receive a third LSID sent by the server by using the third link;

the processor 1203 controls the output apparatus 1202 to send a third authentication request to the server by using the third link, where the third authentication request includes the third LSID; and the processor 1203 controls the input apparatus 1201 to receive a binding acknowledgement message sent by the server by using the third link, so that the client can use all the first link, the second link, and the third link to send to-be-sent data packets, where extension headers of the to-be-sent data packets carry the BID.

Referring to the client 1200 shown in FIG. 12, the processor 1203, the input apparatus 1201, and the output apparatus 1202 may further use the following method. A program, an instruction, and data of the method are stored in the memory 1204.

The processor 1203 controls the output apparatus 1202 to send a first binding request to a server by using a first link, and send a second binding request to the server by using a second link, where at least two links are established between the client and the server, the first link is one link in the at least two links, the second link is a link other than the first link in the at least two links, the first binding request carries a first temporary identity ID, and the second binding request carries a second temporary ID;

the processor 1203 controls the input apparatus 1201 to receive a first link session identity LSID sent by the server by using the first link, and receive a second LSID sent by the server by using the second link;

the processor 1203 controls the output apparatus 1202 to send a first authentication request to the server by using the first link, and send a second authentication request to the server by using the second link, where the first authentication request includes the first LSID and first authentication information, and the second authentication request includes the second LSID and second authentication information;

the processor 1203 controls the input apparatus 1201 to receive a binding identity BID sent by the server by using the first link, and receive the BID sent by the server by using the second link; and when the client needs to send data packets, the processor 1203 controls the output apparatus 1202 to use both the first link and the second link to send the to-be-sent data packets, where extension headers of the to-be-sent data packets carry the BID.

In some embodiments of the present invention, after the binding identity BID sent by the server by using the first link is received, and the BID sent by the server by using the second link is received, the processor 1203 controls the output apparatus 1202 to send an IP address request to the server by using the first link or the second link; and the processor 1203 controls the input apparatus 1201 to receive an IP address allocated by the server to the client.

In some embodiments of the present invention, the processor 1203 is specifically configured to perform the following steps:

allocating, according to a time sequence relationship between a first data packet and a second data packet, a first packet sequence number to the first data packet and a second packet sequence number to the second data packet respectively; and sending the first data packet to the server by using the first link, and sending the second data packet to the server by using the second link, where an extension header of the first data packet carries the BID and the first packet sequence number, an extension header of the second data packet carries the BID and the second packet sequence number, and source IP addresses in the first data packet and the second data packet are the IP address of the client.

In some embodiments of the present invention, after the binding identity BID sent by the server by using the first link is received, and the BID sent by the server by using the second link is received, the processor 1203 controls the output apparatus 1202 to send a third binding request to the server by using a third link, where the third binding request carries the BID, and the third link is a link other than the first link and the second link in the at least two links;

the processor 1203 controls the input apparatus 1201 to receive a third LSID sent by the server by using the third link;

the processor 1203 controls the output apparatus 1202 to send a third authentication request to the server by using the third link, where the third authentication request includes the third LSID; and the processor 1203 controls the input apparatus 1201 to receive a binding acknowledgement message sent by the server by using the third link, so that the client can use all the first link, the second link, and the third link to send to-be-sent data packets, where extension headers of the to-be-sent data packets carry the BID.

In some embodiments of the present invention, before the first binding request is sent to the server by using the first link, and the second binding request is sent to the server by using the second link, the processor 1203 generates a first temporary ID for the first link according to a unique identity of the client, and generates a second temporary ID for the second link according to the unique identity of the client.

In addition, it should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the present invention, connection relationships between the modules indicate that the modules have communication connections with each other, which may be specifically implemented as one or more communications buses or signal cables. A person of ordinary skill in the art may understand and implement the embodiments of the present invention without creative efforts.

Based on the description of the foregoing implementation manners, a person skilled in the art may clearly understand that the present invention may be implemented by software in addition to necessary universal hardware, or by dedicated hardware, including an application-specific integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation manner in most cases. Based on such an understanding, the technical solutions of the present invention essentially or the part contributing to the prior art may be implemented in a form of a software product. The computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods described in the embodiments of the present invention.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A multi-link convergence method, comprising:
receiving, by a server, a first binding request sent by a client using a first link, wherein at least two links are established between the client and the server, and the first link is one link in the at least two links;
sending, by the server, a first link session identity (LSID) to the client using the first link;
receiving, by the server, a first authentication request sent by the client using the first link, wherein the first authentication request comprises the first LSID and first authentication information;
performing, by the server, authentication on the first link according to the first authentication request;
when the first link is authenticated successfully, sending, by the server, a binding identity (BID) to the client using the first link;
receiving, by the server, a second binding request sent by the client using a second link, wherein the second binding request carries the BID, and the second link is a link other than the first link in the at least two links;
sending, by the server, a second LSID to the client using the second link;
receiving, by the server, a second authentication request sent by the client using the second link, wherein the second authentication request comprises the second LSID and second authentication information;
performing, by the server, authentication on the second link according to the second authentication request; and
when the second link is authenticated successfully, sending, by the server, a binding acknowledgement message to the client using the second link, to enable the client to use both the first link and the second link to send to-be-sent data packets, wherein extension headers of the to-be-sent data packets carry the BID.

2. The method according to claim 1, wherein after the sending, by the server, a binding acknowledgement message to the client using the second link, the method further comprises:
receiving, by the server, an IP address request sent by the client using the first link or the second link; and allocating, by the server, an IP address to the client, and sending the IP address to the client.

3. The method according to claim 2, wherein after the allocating, by the server, an IP address to the client, and sending the IP address to the client, the method further comprises:
receiving, by the server using the first link, a first data packet sent by the client, and receiving, by the server using the second link, a second data packet sent by the client, wherein an extension header of the first data packet carries the BID and a first packet sequence number, an extension header of the second data packet carries the BID and a second packet sequence number, and source IP addresses in the first data packet and the second data packet are the IP address of the client;
determining, by the server according to the same BID carried in the first data packet and the second data packet, that the first data packet and the second data packet are data packets received using both the first link and the second link;
sorting, by the server, the first data packet and the second data packet according to a time sequence relationship between the first packet sequence number and the second packet sequence number, and recombining the sorted first data packet and second data packet to obtain a data packet combination; and
sending, by the server, the data packet combination to a destination device.

4. The method according to claim 1, wherein after the sending, by the server, a binding acknowledgement message to the client using the second link, the method further comprises:
receiving, by the server, a third binding request sent by the client using a third link, wherein the third binding request carries the BID, and the third link is a link other than the first link and the second link in the at least two links;
sending, by the server, a third LSID to the client using the third link;
receiving, by the server, a third authentication request sent by the client using the third link, wherein the third authentication request comprises the third LSID;
performing, by the server, authentication on the third link according to the third authentication request; and
when the third link is authenticated successfully, sending, by the server, a binding acknowledgement message to the client using the third link, to enable the client to use all the first link, the second link, and the third link to send to-be-sent data packets, wherein extension headers of the to-be-sent data packets carry the BID.

5. A multi-link convergence method, comprising:
sending, by a client, a first binding request to a server using a first link, wherein at least two links are established between the client and the server, and the first link is one link in the at least two links;
receiving, by the client, a first link session identity (LSID) sent by the server using the first link;
sending, by the client, a first authentication request to the server using the first link, wherein the first authentication request comprises the first LSID and first authentication information;
receiving, by the client, a binding identity (BID) sent by the server using the first link;
sending, by the client, a second binding request to the server using a second link, wherein the second binding request carries the BID, and the second link is a link other than the first link in the at least two links;
receiving, by the client, a second LSID sent by the server using the second link;
sending, by the client, a second authentication request to the server using the second link, wherein the second authentication request comprises the second LSID and second authentication information;
receiving, by the client, a binding acknowledgement message sent by the server using the second link; and
when the client needs to send data packets, using, by the client, both the first link and the second link to send to-be-sent data packets, wherein extension headers of the to-be-sent data packets carry the BID.

6. The method according to claim 5, wherein after the receiving, by the client, a binding acknowledgement message sent by the server using the second link, the method further comprises:
sending, by the client, an IP address request to the server using the first link or the second link; and
receiving, by the client, an IP address allocated by the server to the client.

7. The method according to claim 6, wherein the using, by the client, both the first link and the second link to send the to-be-sent data packets, comprises:
allocating, by the client according to a time sequence relationship between a first data packet and a second data packet, a first packet sequence number to the first data packet and a second packet sequence number to the second data packet, respectively; and
sending, by the client, the first data packet to the server using the first link, and sending the second data packet to the server using the second link, wherein an extension header of the first data packet carries the BID and the first packet sequence number, an extension header of the second data packet carries the BID and the second packet sequence number, and source IP addresses in the first data packet and the second data packet are the IP address of the client.

8. The method according to claim 5, wherein the BID is encapsulated in a data link layer of the to-be-sent data packets by the client.

9. The method according to claim 5, wherein after the receiving, by the client, a binding acknowledgement message sent by the server using the second link, the method further comprises:
sending, by the client, a third binding request to the server using a third link, wherein the third binding request carries the BID, and the third link is a link other than the first link and the second link in the at least two links;
receiving, by the client, a third LSID sent by the server using the third link;
sending, by the client, a third authentication request to the server using the third link, wherein the third authentication request comprises the third LSID; and
receiving, by the client, a binding acknowledgement message sent by the server using the third link, to enable the client to use all the first link, the second link, and the third link to send to-be-sent data packets, wherein extension headers of the to-be-sent data packets carry the BID.

10. A multi-link convergence method, comprising:
receiving, by a server, a first binding request sent by a client using a first link, and receiving a second binding request sent by the client using a second link, wherein at least two links are established between the client and the server, the first link is one link in the at least two links, the second link is a link other than the first link in the at least two links, the first binding request carries a first temporary identity (ID), and the second binding request carries a second temporary ID;

sending, by the server, a first link session identity (LSID) to the client using the first link, and sending a second LSID to the client using the second link;

receiving, by the server, a first authentication request sent by the client using the first link, and receiving a second authentication request sent by the client using the second link, wherein the first authentication request comprises the first LSID and first authentication information, and the second authentication request comprises the second LSID and second authentication information;

performing, by the server, authentication on the first link according to the first authentication request, and performing authentication on the second link according to the second authentication request; and when both the first link and the second link are authenticated successfully, and the server determines that the first temporary ID and the second temporary ID are the same temporary ID, sending, by the server, a binding identity (BID) to the client using the first link, and sending the BID to the client using the second link, to enable the client to use both the first link and the second link to send to-be-sent data packets, wherein extension headers of the to-be-sent data packets carry the BID.

11. The method according to claim 10, wherein after the sending, by the server, a binding identity BID to the client using the first link, and sending the BID to the client using the second link, the method further comprises:

receiving, by the server, an IP address request sent by the client using the first link or the second link; and allocating, by the server, an IP address to the client, and sending the IP address to the client.

12. The method according to claim 11, wherein after the allocating, by the server, an IP address to the client, and sending the IP address to the client, the method further comprises:

receiving, by the server using the first link, a first data packet sent by the client, and receiving, by the server using the second link, a second data packet sent by the client, wherein an extension header of the first data packet carries the BID and a first packet sequence number, an extension header of the second data packet carries the BID and a second packet sequence number, and source IP addresses in the first data packet and the second data packet are the IP address of the client;

determining, by the server according to the same BID carried in the first data packet and the second data packet, that the first data packet and the second data packet are data packets received using both the first link and the second link;

sorting, by the server, the first data packet and the second data packet according to a time sequence relationship between the first packet sequence number and the second packet sequence number, and recombining the sorted first data packet and second data packet to obtain a data packet combination; and sending, by the server, the data packet combination to a destination device.

13. The method according to claim 10, wherein after the sending, by the server, a BID to the client using the first link, and sending the BID to the client using the second link, the method further comprises:

receiving, by the server, a third binding request sent by the client using a third link, wherein the third binding request carries the BID, and the third link is a link other than the first link and the second link in the at least two links;

sending, by the server, a third LSID to the client using the third link;

receiving, by the server, a third authentication request sent by the client using the third link, wherein the third authentication request comprises the third LSID;

performing, by the server, authentication on the third link according to the third authentication request; and when the third link is authenticated successfully, sending, by the server, a binding acknowledgement message to the client using the third link, to enable the client to use all the first link, the second link, and the third link to send to-be-sent data packets, wherein extension headers of the to-be-sent data packets carry the BID.

14. A multi-link convergence method, comprising:

sending, by a client, a first binding request to a server using a first link, and sending a second binding request to the server using a second link, wherein at least two links are established between the client and the server, the first link is one link in the at least two links, the second link is a link other than the first link in the at least two links, the first binding request carries a first temporary identity (ID), and the second binding request carries a second temporary ID;

receiving, by the client, a first link session identity (LSID) sent by the server using the first link, and receiving a second LSID sent by the server using the second link;

sending, by the client, a first authentication request to the server using the first link, and sending a second authentication request to the server using the second link, wherein the first authentication request comprises the first LSID and first authentication information, and the second authentication request comprises the second LSID and second authentication information;

receiving, by the client, a binding identity (BID) sent by the server using the first link, and receiving the BID sent by the server using the second link; and when the client needs to send data packets, using, by the client, both the first link and the second link to send the to-be-sent data packets, wherein extension headers of the to-be-sent data packets carry the BID.

15. The method according to claim 14, wherein after the receiving, by the client, a binding identity BID sent by the server using the first link, and receiving the BID sent by the server using the second link, the method further comprises:

sending, by the client, an IP address request to the server using the first link or the second link; and receiving, by the client, an IP address allocated by the server to the client.

16. The method according to claim 15, wherein the using, by the client, both the first link and the second link to send the to-be-sent data packets, comprises:

allocating, by the client according to a time sequence relationship between a first data packet and a second data packet, a first packet sequence number to the first data packet and a second packet sequence number to the second data packet, respectively; and sending, by the client, the first data packet to the server using the first link, and sending the second data packet to the server using the second link, wherein an extension header of the first data packet carries the BID and the first packet sequence number, an extension header of the second data packet carries the BID and the second packet sequence number, and source IP addresses in the first data packet and the second data packet are the IP address of the client.

17. The method according to claim 14, wherein the BID is encapsulated in a data link layer of the to-be-sent data packets by the client.

18. The method according to claim 14, wherein after the receiving, by the client, a binding identity BID sent by the server using the first link, and receiving the BID sent by the server using the second link, the method further comprises:
   sending, by the client, a third binding request to the server using a third link, wherein the third binding request carries the BID, and the third link is a link other than the first link and the second link in the at least two links;
   receiving, by the client, a third LSID sent by the server using the third link;
   sending, by the client, a third authentication request to the server using the third link, wherein the third authentication request comprises the third LSID; and
   receiving, by the client, a binding acknowledgement message sent by the server using the third link, to enable the client to use all the first link, the second link, and the third link to send to-be-sent data packets, wherein extension headers of the to-be-sent data packets carry the BID.

19. The method according to claim 14, wherein before the sending, by a client, a first binding request to a server using a first link, and sending a second binding request to the server using a second link, the method further comprises:
   generating, by the client, a first temporary ID for the first link according to a unique identity of the client, and generating a second temporary ID for the second link according to the unique identity of the client.

* * * * *